(12) United States Patent
Yuan et al.

(10) Patent No.: US 12,402,106 B2
(45) Date of Patent: Aug. 26, 2025

(54) PANEL-SPECIFIC SLOT FORMAT INDICATION

(71) Applicant: QUALCOMM Incorporated, San Diego, CA (US)

(72) Inventors: Fang Yuan, Beijing (CN); Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 403 days.

(21) Appl. No.: 18/006,718

(22) PCT Filed: Aug. 6, 2020

(86) PCT No.: PCT/CN2020/107321
§ 371 (c)(1),
(2) Date: Jan. 24, 2023

(87) PCT Pub. No.: WO2022/027410
PCT Pub. Date: Feb. 10, 2022

(65) Prior Publication Data
US 2023/0337196 A1    Oct. 19, 2023

(51) Int. Cl.
*H04W 72/0446*    (2023.01)
*H04W 72/23*    (2023.01)
*H04W 72/51*    (2023.01)

(52) U.S. Cl.
CPC ....... *H04W 72/0446* (2013.01); *H04W 72/23* (2023.01); *H04W 72/51* (2023.01)

(58) Field of Classification Search
CPC .. H04W 72/0446; H04W 72/51; H04W 72/23
See application file for complete search history.

(56) References Cited

U.S. PATENT DOCUMENTS 12,143,186 B2 *  11/2024  Zhang ................. H04W 52/365
12,155,439 B2 *  11/2024  Zhang ................. H04B 7/0404
(Continued)

FOREIGN PATENT DOCUMENTS

CN       111149388 A     5/2020

OTHER PUBLICATIONS

International Search Report and Written Opinion—PCT/CN2020/107321—ISA/EPO—Apr. 27, 2021.
(Continued)

*Primary Examiner* — Melvin C Marcelo
(74) *Attorney, Agent, or Firm* — Holland & Hart LLP

(57) ABSTRACT

Methods, systems, and devices for wireless communications are described. A user equipment (UE) may identify a configuration to perform multi-panel communications with a base station using a first panel and a second panel of the UE. The base station may transmit indications of a first slot format and a second slot format for the first panel and the second panel for a time period, at least one symbol for the first slot format having a different communication direction than for the second slot format. The base station may indicate the slot formats in a common configuration and a dedicated configuration for the first panel and the second panel. Additionally or alternatively, the base station may indicate the slot formats in a corresponding downlink control information (DCI) message. The UE and the base station may communicate using the first panel and second panel according to the corresponding slot format.

30 Claims, 20 Drawing Sheets

(56) References Cited

U.S. PATENT DOCUMENTS

2019/0090212 A1 3/2019 Chou
2020/0169995 A1 5/2020 Nam et al.
2024/0088945 A1* 3/2024 Yuan .................. H04W 72/542

OTHER PUBLICATIONS

ZTE: "Preliminary Views on Further Enhancement for NR MIMO", 3GPP TSG RAN WG1 Meeting #101-e, R1-2003483, e-Meeting, May 25-Jun. 5, 2020, 19 pages, Jun. 5, 2020 (Jun. 5, 2020), section 2.2.2, the whole document.

* cited by examiner

Common Configuration 410

Panel 405-a

Panel 405-b

Common Configuration 410 plus
Dedicated Configuration 415

Panel 405-a

Panel 405-b

Downlink Slot 420     Uplink Slot 425

Flexible Slot 430     Special Slot 435

400

PANEL-SPECIFIC SLOT FORMAT INDICATION

CROSS REFERENCE

The present application is a 371 national stage filing of International PCT Application No. PCT/CN2020/107321 by Yuan et al. entitled "PANEL-SPECIFIC SLOT FORMAT INDICATION," filed Aug. 6, 2020, which is assigned to the assignee hereof, and which is expressly incorporated by reference in its entirety herein.

FIELD OF TECHNOLOGY

The following relates to wireless communications, including panel-specific slot format indication.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support panel-specific slot format indication. Generally, the described techniques provide for a UE to identify a configuration to perform multi-panel communications with a base station based on an indicated slot format per panel used by the UE. For example, the base station may indicate the slot format in a common configuration and a dedicated configuration for each panel. Additionally or alternatively, the base station may indicate the slot format for each panel in a corresponding downlink control information (DCI) message. The base station may transmit the indication of the slot format for each panel to the UE based on the configuration.

In some cases, the configuration may include a control search space for each panel, a radio network temporary identifier (RNTI) for each panel, or both. The UE may monitor a DCI message for each panel based on the search space, the RNTI, or both, corresponding to the panel. The UE may detect a slot format for each panel in the DCI message based on monitoring. In some examples, the UE may transmit a capability to perform multi-panel communication to the base station. For example, the UE may transmit an indication of supporting a slot format per panel to the base station. The base station may transmit the configuration to the UE based on receiving the UE capability. The UE and the base station may communicate using the panels according to each indicated slot format. For example, in multi-panel communications, the UE may receive one or more messages, transmit one or more messages, or both, to the base station using different panels according to the slot format for each panel.

A method of wireless communication at a UE is described. The method may include identifying a configuration of the UE to perform multi-panel communications with a base station using at least a first panel and a second panel of the UE, receiving a first indication of a first slot format for the first panel for a time period and a second indication of a second slot format for the second panel for the time period, at least one symbol for the first slot format for the first panel having a different communication direction than for the second slot format for the second panel, and communicating with the base station for the time period using the first panel according to the first slot format and using the second panel according to the second slot format.

An apparatus for wireless communication at a UE is described. The apparatus may include a processor, memory coupled with the processor, and instructions stored in the memory. The instructions may be executable by the processor to cause the apparatus to identify a configuration of the UE to perform multi-panel communications with a base station using at least a first panel and a second panel of the UE, receive a first indication of a first slot format for the first panel for a time period and a second indication of a second slot format for the second panel for the time period, at least one symbol for the first slot format for the first panel having a different communication direction than for the second slot format for the second panel, and communicate with the base station for the time period using the first panel according to the first slot format and using the second panel according to the second slot format.

Another apparatus for wireless communication at a UE is described. The apparatus may include means for identifying a configuration of the UE to perform multi-panel communications with a base station using at least a first panel and a second panel of the UE, receiving a first indication of a first slot format for the first panel for a time period and a second indication of a second slot format for the second panel for the time period, at least one symbol for the first slot format for the first panel having a different communication direction than for the second slot format for the second panel, and communicating with the base station for the time period using the first panel according to the first slot format and using the second panel according to the second slot format.

A non-transitory computer-readable medium storing code for wireless communication at a UE is described. The code may include instructions executable by a processor to identify a configuration of the UE to perform multi-panel communications with a base station using at least a first panel and a second panel of the UE, receive a first indication of a first slot format for the first panel for a time period and a second indication of a second slot format for the second panel for the time period, at least one symbol for the first slot format for the first panel having a different communication direction than for the second slot format for the second panel, and communicate with the base station for the time period using the first panel according to the first slot format and using the second panel according to the second slot format.

Some examples of the method, apparatuses, and non-transitory computer-readable medium described herein may further include operations, features, means, or instructions for transmitting a message indicating a capability of the UE to perform the multi-panel communications, the configuration based on the transmitted message indicating the capability.

In some examples of the method, apparatuses, and non-transitory computer-readable medium described herein, receiving the first indication of the first slot format and the second indication of the second slot format may include operations, features, means, or instructions for receiving a first common configuration and a first dedicated configuration that indicate the first slot format for the first panel, and receiving a second common configuration and a second dedicated configuration that indicate the second slot format for the second panel.

In some examples of the method, apparatuses, and non-transitory computer-readable medium described herein, receiving the first indication and the second indication may include operations, features, means, or instructions for receiving a DCI message including the first indication of the first slot format for the first panel and the second indication of the second slot format for the second panel.

Some examples of the method, apparatuses, and non-transitory computer-readable medium described herein may further include operations, features, means, or instructions for receiving an indication of a first position corresponding to the first indication and an indication of a second position corresponding to the second indication, where the first indication may be received in the DCI message according to the indicated first position, and the second indication may be received in the DCI message according to the indicated second position.

Some examples of the method, apparatuses, and non-transitory computer-readable medium described herein may further include operations, features, means, or instructions for receiving an indication of a position of a multi-panel slot format indication (MP-SFI) block in the DCI message, where the first indication and the second indication may be received in the MP-SFI block in the DCI message according to the indicated position.

Some examples of the method, apparatuses, and non-transitory computer-readable medium described herein may further include operations, features, means, or instructions for receiving a configuration identifying a first RNTI associated with the first panel and a second RNTI associated with the second panel, where the first indication may be received based on the first RNTI, and the second indication may be received based on the second RNTI.

Some examples of the method, apparatuses, and non-transitory computer-readable medium described herein may further include operations, features, means, or instructions for monitoring, according to the first RNTI based on the received configuration, for a first DCI message including the first indication of the first slot format for the first panel, the first indication received based on the monitoring according to the first RNTI, and monitoring, according to the second RNTI based on the received configuration, for a second DCI message including the second indication of the second slot format for the second panel, the second indication received based on the monitoring according to the second RNTI.

Some examples of the method, apparatuses, and non-transitory computer-readable medium described herein may further include operations, features, means, or instructions for receiving a configuration identifying a first control search space associated with the first panel and a second control search space associated with the second panel, where the first indication may be received in the first control search space, and the second indication may be received in the second control search space.

Some examples of the method, apparatuses, and non-transitory computer-readable medium described herein may further include operations, features, means, or instructions for monitoring, based on the received configuration, the first control search space for a first DCI message including the first indication of the first slot format for the first panel, the first indication received based on the monitoring the first control search space, and monitoring, based on the received configuration, the second control search space for a second DCI message including the second indication of the second slot format for the second panel, the second indication received based on the monitoring the second control search space.

In some examples of the method, apparatuses, and non-transitory computer-readable medium described herein, communicating with the base station for the time period using the first panel and the second panel may include operations, features, means, or instructions for performing a sounding reference signal (SRS) transmission, a physical uplink control channel (PUCCH) transmission, a physical uplink shared channel (PUSCH) transmission, a physical random access channel (PRACH) transmission, or a combination thereof.

In some examples of the method, apparatuses, and non-transitory computer-readable medium described herein, the communicating may include operations, features, means, or instructions for transmitting a first uplink transmission or receiving a first downlink transmission using the first panel according to the first slot format, and transmitting a second uplink transmission or receiving a second downlink transmission using the second panel according to the second slot format.

A method of wireless communication at a base station is described. The method may include identifying a configuration of a UE to perform multi-panel communications with the base station using at least a first panel and a second panel of the UE, transmitting a first indication of a first slot format for the first panel for a time period and a second indication of a second slot format for the second panel for the time period, at least one symbol for the first slot format for the first panel having a different communication direction than for the second slot format for the second panel, and communicating with the UE for the time period using the first panel according to the first slot format and using the second panel according to the second slot format.

An apparatus for wireless communication at a base station is described. The apparatus may include a processor, memory coupled with the processor, and instructions stored in the memory. The instructions may be executable by the processor to cause the apparatus to identify a configuration of a UE to perform multi-panel communications with the base station using at least a first panel and a second panel of the UE, transmit a first indication of a first slot format for the first panel for a time period and a second indication of a second slot format for the second panel for the time period, at least one symbol for the first slot format for the first panel having a different communication direction than for the second slot format for the second panel, and communicate with the UE for the time period using the first panel according to the first slot format and using the second panel according to the second slot format.

Another apparatus for wireless communication at a base station is described. The apparatus may include means for identifying a configuration of a UE to perform multi-panel communications with the base station using at least a first panel and a second panel of the UE, transmitting a first indication of a first slot format for the first panel for a time period and a second indication of a second slot format for the second panel for the time period, at least one symbol for the first slot format for the first panel having a different communication direction than for the second slot format for the second panel, and communicating with the UE for the time period using the first panel according to the first slot format and using the second panel according to the second slot format.

A non-transitory computer-readable medium storing code for wireless communication at a base station is described. The code may include instructions executable by a processor to identify a configuration of a UE to perform multi-panel communications with the base station using at least a first panel and a second panel of the UE, transmit a first indication of a first slot format for the first panel for a time period and a second indication of a second slot format for the second panel for the time period, at least one symbol for the first slot format for the first panel having a different communication direction than for the second slot format for the second panel, and communicate with the UE for the time period using the first panel according to the first slot format and using the second panel according to the second slot format.

Some examples of the method, apparatuses, and non-transitory computer-readable medium described herein may further include operations, features, means, or instructions for receiving, from the UE, a message indicating a capability of the UE to perform the multi-panel communications, the configuration based on the received message indicating the capability.

In some examples of the method, apparatuses, and non-transitory computer-readable medium described herein, transmitting the first indication of the first slot format and the second indication of the second slot format may include operations, features, means, or instructions for transmitting a first common configuration and a first dedicated configuration that indicate the first slot format for the first panel, and transmitting a second common configuration and a second dedicated configuration that indicate the second slot format for the second panel.

In some examples of the method, apparatuses, and non-transitory computer-readable medium described herein, transmitting the first indication and the second indication may include operations, features, means, or instructions for transmitting a DCI message including the first indication of the first slot format for the first panel and the second indication of the second slot format for the second panel.

Some examples of the method, apparatuses, and non-transitory computer-readable medium described herein may further include operations, features, means, or instructions for transmitting an indication of a first position corresponding to the first indication and an indication of a second position corresponding to the second indication, where the first indication may be transmitted in the DCI message according to the indicated first position, and the second indication may be transmitted in the DCI message according to the indicated second position.

Some examples of the method, apparatuses, and non-transitory computer-readable medium described herein may further include operations, features, means, or instructions for transmitting an indication of a position of an MP-SFI block in the DCI message, where the first indication and the second indication may be transmitted in the MP-SFI block in the DCI message according to the indicated position.

Some examples of the method, apparatuses, and non-transitory computer-readable medium described herein may further include operations, features, means, or instructions for transmitting a configuration identifying a first RNTI associated with the first panel and a second RNTI associated with the second panel, where the first indication may be transmitted based on the first RNTI, and the second indication may be transmitted based on the second RNTI.

Some examples of the method, apparatuses, and non-transitory computer-readable medium described herein may further include operations, features, means, or instructions for transmitting a configuration identifying a first control search space associated with the first panel and a second control search space associated with the second panel, where the first indication may be transmitted in the first control search space, and the second indication may be transmitted in the second control search space.

In some examples of the method, apparatuses, and non-transitory computer-readable medium described herein, communicating with the UE for the time period using the first panel and the second panel may include operations, features, means, or instructions for receiving a SRS transmission, a PUCCH transmission, a PUSCH transmission, a PRACH transmission, or a combination thereof.

In some examples of the method, apparatuses, and non-transitory computer-readable medium described herein, the communicating may include operations, features, means, or instructions for receiving, from the UE, a first uplink transmission or transmitting, to the UE, a first downlink transmission using the first panel according to the first slot format, and receiving, from the UE, a second uplink transmission or transmitting, to the UE, a second downlink transmission using the second panel according to the second slot format.

DETAILED DESCRIPTION

Figure 1:
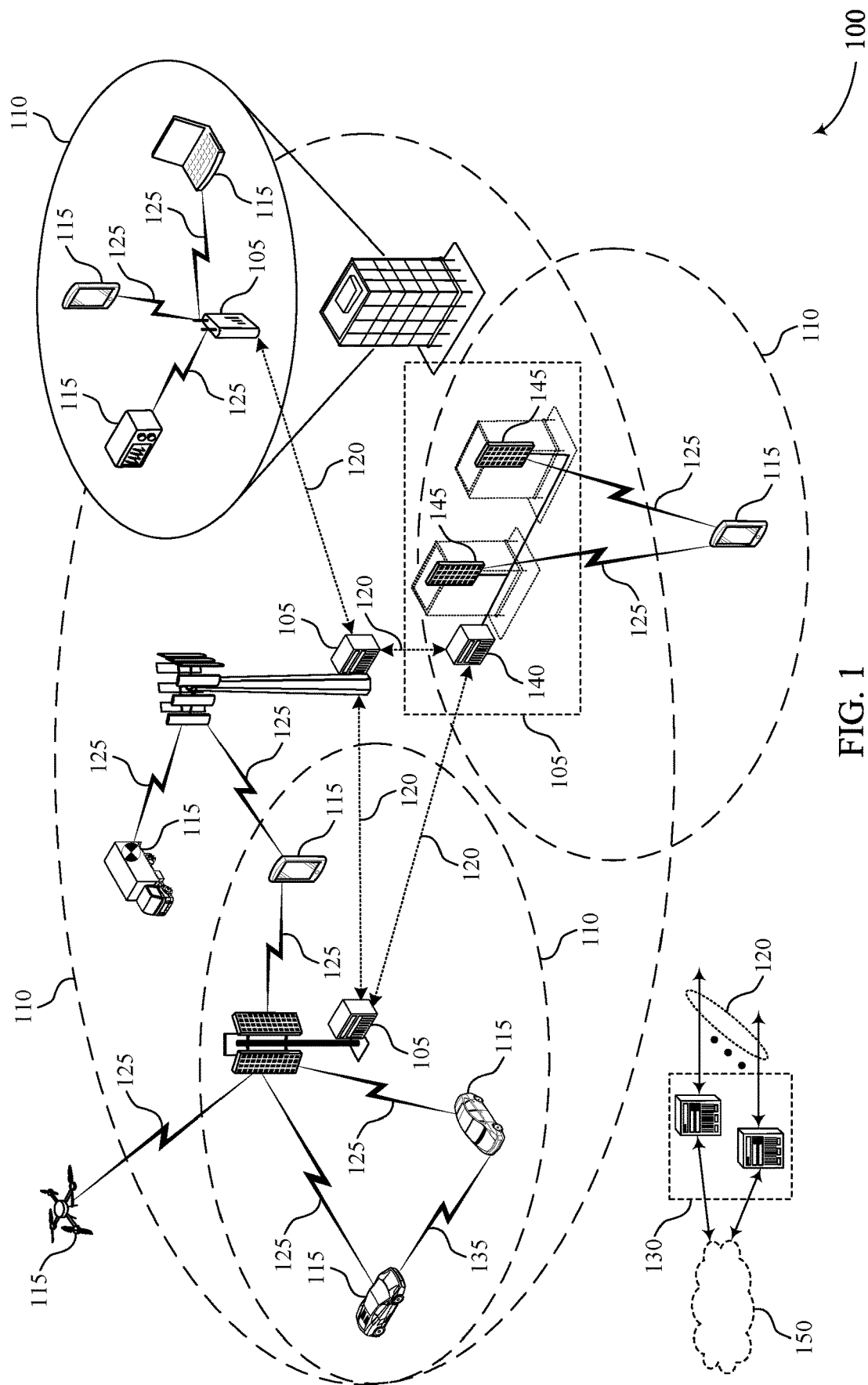
FIGS. 1 and 2 illustrate examples of wireless communications systems that support panel-specific slot format indication in accordance with aspects of the present disclosure.

In some cases, a base station may transmit a configuration, such as a slot format configuration, to a user equipment (UE) performing multi-panel communication. The UE may receive a slot format based on the configuration. The slot format may correspond to a communication direction (e.g., uplink or downlink) for symbols, slots, or both. The base station may transmit an indication of the slot format to the UE via control signaling. For example, the base station may transmit the slot format to the UE in a downlink control information (DCI) message using a slot format indicator (SFI) field. Additionally or alternatively, the base station may configure the UE with a slot format based on transmitting a common configuration and a dedicated configuration to the UE. The common configuration may configure a slot format per slot, symbol, or both, to be uplink, downlink, or flexible. The dedicated configuration may configure the flexible slots, symbols, or both, of the common configuration as uplink or downlink. In some examples, the slot format may be the same for each panel of the UE for multi-panel communication. However, these techniques may not enable or otherwise permit the UE to be configured with a slot format for each panel when communicating with a base station using multiple panels, which may cause inefficient resource allocation.

As described herein, a UE may identify a configuration to perform multi-panel communications with a base station based on an indicated slot format per panel. In some cases, the base station may transmit a configuration corresponding to how the slot formats may be indicated for each panel at the UE used for multi-panel communications. For example, the base station may indicate the slot format in a common configuration and a dedicated configuration for each panel. Additionally or alternatively, the base station may indicate the slot format for each panel in a corresponding DCI message. The base station may transmit the indication of the slot format for each panel to the UE based on the configuration.

In some cases, the configuration may include a control search space for each panel, a radio network temporary identifier (RNTI) for each panel, or both. The UE may monitor for a DCI message for each panel based on the search space, the RNTI, or both, corresponding to the panel. The UE may detect a slot format for each panel in the DCI message based on monitoring. In some examples, the UE may transmit a capability to perform multi-panel communication to the base station. For example, the UE may transmit an indication of supporting a slot format per panel to the base station. The base station may transmit the configuration to the UE based on receiving the UE capability. The UE and the base station may communicate using the panels according to each indicated slot format. For example, in multi-panel communications, the UE may receive one or more messages, transmit one or more messages, or both, to the base station using different panels according to the slot format for each panel.

Aspects of the disclosure are initially described in the context of wireless communications systems. Aspects of the disclosure are further described in the context of panel configurations, a slot format diagram, a control diagram, and process flows. Aspects of the disclosure are further illustrated by and described with reference to apparatus diagrams, system diagrams, and flowcharts that relate to panel-specific slot format indication.

FIG. 1 illustrates an example of a wireless communications system 100 that supports panel-specific slot format indication in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both, at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof.

For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both, to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both, to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a base station 105 may transmit a configuration, such as a slot format configuration, to a UE 115 performing multi-panel communication. The UE 115 may receive a slot format based on the configuration. The slot format may correspond to a communication direction (e.g., uplink or downlink) for symbols, slots, or both. The base station 105 may transmit an indication of the slot format to the UE 115 via control signaling. For example, the base station 105 may transmit the slot format to the UE 115 in a DCI message using a slot format indicator (SFI) field. Additionally or alternatively, the base station 105 may configure the UE 115 with a slot format based on transmitting a common configuration and a dedicated configuration to the UE 115. The common configuration may configure a slot format per slot, symbol, or both, to be uplink, downlink, or flexible. The dedicated configuration may configure the flexible slots, symbols, or both, of the common configuration as uplink or downlink (e.g., may override flexible symbols). In some examples, the slot format may be the same for each panel of the UE 115 for multi-panel communication. However, these techniques may not enable or otherwise permit the UE 115 to be configured with a slot format for each panel when communicating with a base station 105 using multiple panels, which may cause inefficient resource allocation.

As described herein, wireless communications system 100 may support the use of techniques in which a UE 115 may identify a configuration to perform multi-panel communications with a base station 105 based on an indicated slot format per panel. For example, a base station 105 may transmit a configuration corresponding to how the slot formats may be indicated for each panel at a UE 115 used for multi-panel communications. Subsequently, the base station 105 may transmit the indication of the slot format for each panel to the UE 115. In some cases, the indication of a slot format may include a common configuration and a dedicated configuration for each panel. Additionally or alternatively, the indication of the slot format may be included in a DCI message. The configuration may indicate whether the indication of the slot format includes a common and dedicated configuration or is included in a DCI message.

In some cases, the configuration may include a control search space for each panel, an RNTI for each panel, or both. The UE 115 may monitor for a DCI message for each panel based on the search space, the RNTI, or both, corresponding to the panel. The UE 115 may detect a slot format for each panel in the DCI message based on monitoring. In some examples, the UE 115 may transmit a capability to perform multi-panel communication to the base station 105. For example, the UE 115 may transmit an indication of supporting a slot format per panel to the base station 105. The base station 105 may transmit the configuration to the UE 115 based on receiving the UE capability. The UE 115 and the base station 105 may communicate using the panels according to each indicated slot format. For example, in multi-panel communications, the UE 115 may receive one or more message, transmit one or more messages, or both, to the base station 105 using different panels according to the slot format for each panel.

Figure 2:
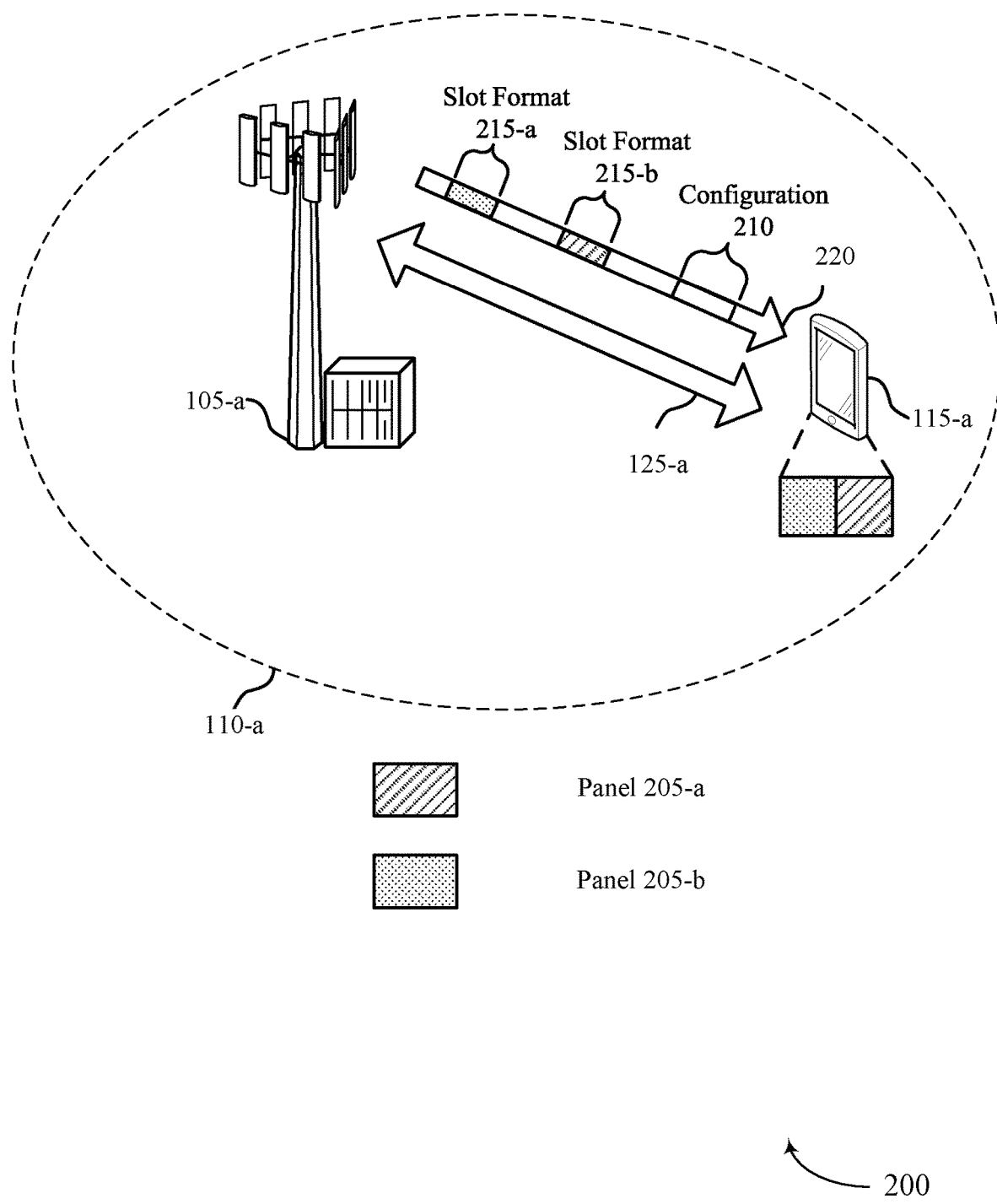

FIG. 2 illustrates an example of a wireless communications system 200 that supports panel-specific slot format indication in accordance with aspects of the present disclosure. In some examples, wireless communications system 200 may implement aspects of wireless communications system 100 and may include UE 115-a, communication link 125-a, and base station 105-a with coverage area 110-a, which may be examples of a UE 115, a communication link 125, and a base station 105 with a coverage area 110 as described with reference to FIG. 1. In some aspects, UE 115-a may be configured with, or otherwise support, multi-panel transmissions to and from base station 105-a using one or more panels 205. For example, UE 115-a and base station 105-a may communicate using panel 205-a, panel 205-b, or both, via communication link 125-a.

In some cases, a panel 205 of a UE 115 may refer to any configuration of hardware (e.g., antennas), software (e.g., beamforming techniques, directional transmission techniques, weighting criteria, etc.), or both, used to perform uplink transmission or downlink reception. In some examples, a panel 205 of the UE 115 may refer to different antennas of the UE 115, an antenna of the UE 115 using a different configuration for transmissions, or both. For example, a panel 205 may refer to a particular transmitted precoding matrix indicator (TPMI) configured for the UE 115, a sounding reference signal resource indicator (SRI) configured for the UE 115, a transmission configuration indicator (TCI) configured for the UE 115, or the like. When the UE 115 supports multiple panels 205, each panel 205 may be distinguished from other panels 205 using information, which may be included in a panel identification (ID) as described in further detail with reference to FIG. 3. In some cases, panels 205 of UE 115-a (e.g., panel 205-a and panel 205-b) used to perform a multi-panel transmission and reception may use various multiplexing techniques, such as space-division multiplexing (SDM), FDM, TDM, and the like. For example, a panel 205 of UE 115-a may be used for an uplink or downlink transmission corresponding to a spatial configuration of the SDM, a frequency of the FDM, a time period of the TDM.

In some cases, a base station 105 may transmit a configuration 210, such as a slot format configuration, to the UE 115 performing multi-panel communication. The UE 115 may receive a slot format 215 based on the configuration 210. The slot format 215 may correspond to a communication direction (e.g., uplink or downlink) for symbols, slots, or both. In some cases, the slot format 215 may be a pattern in time, such as a TDD pattern. The base station 105 may transmit the slot format 215 to the UE 115 via control signaling. For example, the base station 105 may transmit the slot format 215 to the UE 115 in a DCI message using a slot format indicator (SFI) field. The SFI may identify a TDD pattern from a set of TDD patterns configured at the base station 105 and the UE 115.

Additionally or alternatively, the base station 105 may configure the UE 115 with a TDD pattern, or slot format, based on higher layer signaling, such as radio resource control (RRC) signaling. For example, the base station 105 may transmit a configuration 210 corresponding to a slot format 215 that includes a common configuration and a dedicated configuration to the UE 115. The common configuration may configure a slot format 215 per slot, symbol, or both, to be uplink, downlink, or flexible. The common configuration may provide a reference subcarrier spacing configuration, a pattern (e.g., a TDD pattern), or both. The pattern may be one of a first pattern (pattern1), a second pattern (pattern2), or another pattern and may include a slot configuration period (e.g., in ms), a number of slots with downlink symbols, a number of downlink symbols, a number of slots with uplink symbols, a number of uplink symbols, or a combination. The dedicated configuration may configure the flexible slots, symbols, or both, of the common configuration as uplink or downlink (e.g., may override flexible symbols). The dedicated configuration may include a set of slot configurations, each slot configuration from the set of slot configurations including a slot index, a set of symbols, or both, for a slot. The set of symbols may be downlink or uplink, and the set of symbols may provide a number of downlink first symbols in the slot and a number of uplink last symbols in the slot. Remaining symbols in the slot may be configured as a guard period between downlink and uplink transmissions or may be flexible symbols.

In some examples, the slot format 215 may be the same for each panel 205 of the UE 115 for multi-panel communication. However, these techniques may not enable or otherwise permit the UE 115 to be configured with a slot format 215 for each panel 205 when communicating with a base station 105 using multiple panels 205, which may cause inefficient resource allocation.

In some cases, a UE 115 may identify a configuration to perform multi-panel communications with a base station 105 using panels 205. For example, base station 105-a may transmit a configuration 210 corresponding to an indication of slot formats 215 for each panel 205 at a UE 115 used for multi-panel communications. Base station 105-a may transmit the configuration 210 corresponding to the indication of slot format 215-a and slot format 215-b to UE 115-a via a control link 220. Subsequently, base station 105-a may transmit an indication of slot format 215-a for panel 205-a, slot format 215-b for panel 205-b, and any additional slot formats 215 for panels 205 to UE 115-a. In some cases, the indication of a slot format 215 may include a common configuration and a dedicated configuration for each panel 205, which is described in further detail with respect to FIG. 4. For example, slot format 215-a may correspond to a common configuration and dedicated configuration for panel 205-a, while slot format 215-b may correspond to a common configuration and dedicated configuration for panel 205-b. Base station 105-a may indicate the common configuration and dedicated configuration to UE 115-a using higher layer signaling (e.g., RRC signaling or a MAC-CE) in a shared channel (e.g., a physical downlink shared channel (PDSCH)) via control ink 220.

Additionally or alternatively, the indication of the slot format 215 may be included in a DCI message, which is described in further detail with respect to FIG. 5. For example, base station 105-a may indicate slot format 215-a and slot format 215-b to UE 115-a using lower layer signaling (e.g., in a DCI message) in a downlink control channel (e.g., a physical downlink control channel (PDCCH)) via control link 220. The configuration 210 may indicate whether the indication of the slot format 215 includes a common and dedicated configuration or is included in a DCI message.

In some cases, UE 115-a may monitor DCI based on detecting an RNTI for each panel 205. For example, base station 105-a may configure UE 115-a with multiple RNTIs (e.g., an RNTI for each panel 205) for monitoring DCI in the configuration 210. If UE 115-a detects a DCI with an RNTI of the multiple RNTIs, UE 115-a may receive a slot format 215 (e.g., an SFI) for the corresponding panel 205. Additionally or alternatively, UE 115-a may monitor DCI based on a search space configuration. For example, base station 105-a may transmit a search space configuration for each panel 205 in the configuration 210. The UE may detect a slot format 215 (e.g., an SFI) for each panel 205 based on monitoring the search space. In some examples, UE 115-a may transmit a capability to perform multi-panel communication to base station 105-b. For example, UE 115-a may transmit an indication of supporting a slot format 215 per panel 205 to base station 105-a. Base station 105-a may transmit the configuration 210 to UE 115-a based on receiving the UE capability.

Figure 3A:
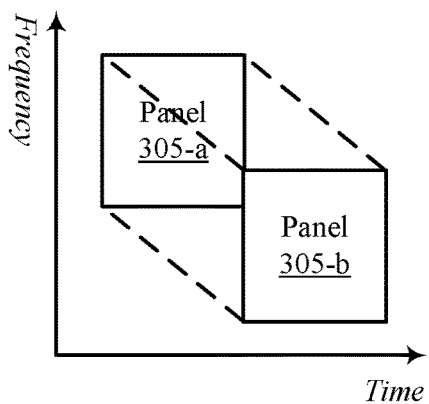
FIGS. 3A-3C illustrate examples of a panel configuration that supports panel-specific slot format indication in accordance with aspects of the present disclosure.
Figure 3B:
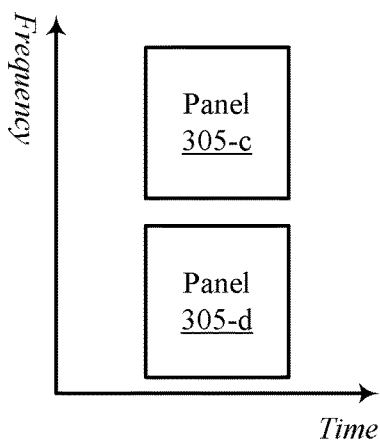
Figure 3C:
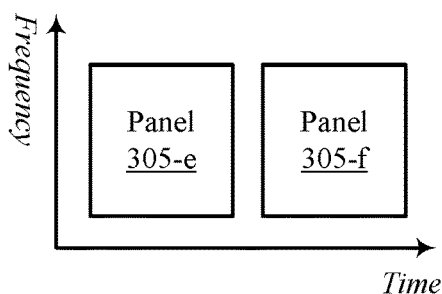

FIGS. 3A-3C illustrate examples of panel configurations 300 that support panel-specific slot format indication in accordance with aspects of the present disclosure. In some examples, panel configurations 300 may implement aspects of wireless communications system 100 or wireless communications system 200. Aspects of panel configurations 300 may be implemented by a UE 115, a base station 105, or both, as described with reference to FIGS. 1 and 2. For example, panel configuration 300-a through panel configuration 300-c may include panel 305-a through panel 305-f, which may be an example of a panel 205 as described with reference to FIG. 2. Generally, panel configuration 300-a of FIG. 3A illustrates an example of the described techniques applied in an SDM scenario, panel configuration 300-b of FIG. 3B illustrates an example of the described techniques applied in an FDM scenario, and transmit panel configuration 300-c of FIG. 3C illustrates an example of the described techniques applied in a TDM scenario.

In some cases, a UE 115 may support multi-panel communications with a base station 105 using panels 305 of the UE 115. Each panel 305 may be distinguished from other panels using information, such as a panel ID. A panel 305 may be associated with a set of downlink or uplink signals and channels, and correspondingly, the panel ID may be associated with the set of signal or channel IDs and indicated or derived by the signal or channel IDs. In one example, a control resource set (CORESET) may be configured with a CORESET pool index. A first panel 305 (e.g., panel 305-a, panel 305-*c*, panel 305-*e*, or a combination) may be associated with a DCI in a CORESET with a first CORESET pool index value (e.g., CORESET pool index 0) and a second panel 305 (e.g., panel 305-*b*, panel 305-*d*, panel 305-*f*, or a combination) may be associated with DCI in a CORESET with a second CORESET pool index value (e.g., CORESET pool index 1).

In another example, a sounding reference signal (SRS) set ID or SRS resource ID may be associated with panel 305-*a*, panel 305-*c*, panel 305-*e*, or the combination and another SRS set ID or SRS resource ID may be associated with panel 305-*b*, panel 305-*d*, panel 305-*f*, or the combination. Further, a beam ID or beam group ID may be associated with panel 305-*a*, panel 305-*c*, panel 305-*e*, or the combination and another beam ID or beam group ID may be associated with panel 305-*b*, panel 305-*d*, panel 305-*f*, or the combination. The beam may be a TCI state or a spatial filter setting for either downlink reception or uplink transmission and may be a spatial relation information indicated for transmitting uplink signals. The beam may be indicated by a reference signal (RS) such as a synchronization signal block (SSB), channel-state-information (CSI) RS or SRS. When a group of beam IDs are configured, the first half of the group of beam IDs may be associated with panel 305-*a*, panel 305-*c*, panel 305-*e*, or the combination, and the second half group of the group of beam IDs may be associated with panel 305-*b*, panel 305-*d*, panel 305-*f*, or the combination.

When a pair of TCI states are indicated, the first TCI state ID in the pair may be associated with panel 305-*a*, panel 305-*c*, panel 305-*e*, or the combination, and the second TCI state ID in the pair may be associated with panel 305-*b*, panel 305-*d*, panel 305-*f*, or the combination. An uplink transmit power control configuration may include a closed loop index, and an uplink transmission with a first closed loop index value (e.g., 0) may be associated with panel 305-*a*, panel 305-*c*, panel 305-*e*, or the combination and another uplink transmission with a second closed loop index value (e.g., 1) may be associated with panel 305-*b*, panel 305-*d*, panel 305-*f*, or the combination.

An antenna port ID or antenna port group ID may be associated with panel 305-*a*, panel 305-*c*, panel 305-*e*, or the combination, and another antenna port ID or antenna port group ID may be associated with panel 305-*b*, panel 305-*d*, panel 305-*f*, or the combination, where the antenna port may include, but is not limited to, a physical uplink shared channel (PUSCH) antenna port, an SRS antenna port, or a phase-tracking RS antenna port. A DMRS code division multiplexing (CDM) group ID may be associated with panel 305-*a*, panel 305-*c*, panel 305-*e*, or the combination, and another DMRS CDM group ID may be associated with panel 305-*b*, panel 305-*d*, panel 305-*f*, or the combination. When multiple DMRS CDM groups are indicated, the first DMRS CDM group may be associated with panel 305-*a*, panel 305-*c*, panel 305-*e*, or the combination, and the second DMRS CDM group may be associated with panel 305-*b*, panel 305-*d*, panel 305-*f*, or the combination.

A timing advance group (TAG) ID may be associated with panel 305-*aaaa*, panel 305-*c*, panel 305-*e*, or the combination, and another TAG ID may be associated with panel 305-*b*, panel 305-*d*, panel 305-*f*, or the combination. A physical uplink control channel (PUCCH) resource ID or resource group ID may be associated with panel 305-*a*, panel 305-*c*, panel 305-*e*, or the combination, and another PUCCH resource ID or resource group ID may be associated with panel 305-*b*, panel 305-*d*, panel 305-*f*, or the combination. When a group of PUCCH resource IDs are configured, the first half group of the PUCCH resource IDs may be associated with panel 305-*b*, panel 305-*d*, panel 305-*f*, or the combination, and the second half group of PUCCH resource IDs may be associated with panel 305-*b*, panel 305-*d*, panel 305-*f*, or the combination. A radio network temporary identifier (RNTI) may be associated with panel 305-*a*, panel 305-*c*, panel 305-*e*, or the combination, and another RNTI may be associated with panel 305-*b*, panel 305-*d*, panel 305-*f*, or the combination. A physical cell identity (PCI) or synchronization signal block (SSB) set ID may be associated with panel 305-*a*, panel 305-*c*, panel 305-*e*, or the combination, and another PCI or SSB set ID may be associated with panel 305-*b*, panel 305-*d*, panel 305-*f*, or the combination. By referring to or otherwise indicating the signal or channel IDs, the corresponding panel ID can be referred or indicated (e.g., implicitly signaled in the configuration signal).

As discussed herein, a UE 115 may support multi-panel uplink transmissions to a base station 105 using panels 305 of the UE 115, such as a panel 305-*a* through panel 305-*f*. Generally, a panel 305 of the UE 115 may refer to any configuration of hardware (e.g., antennas), software (e.g., beamforming techniques, directional transmission techniques, weighting criteria, etc.), or both, used to perform an uplink transmission or downlink reception. In some examples, a panel 305 of the UE 115 may refer to different antennas of the UE 115, to an antenna of the UE 115 using different configurations for transmissions, or both. In some example, multiple panels 305 of the UE 115 may be used to perform a multi-panel uplink transmission using various multiplexing techniques, such as SDM, FDM, TDM, a combination of two or more of SDM, FDM, and TDM, and the like. As illustrated in FIG. 3A, panel 305-*a* and panel 305-*b* of the UE 115 may be used for a transmission on a spatial configuration of the SDM. As illustrated in FIG. 3B, panel 305-*c* and panel 305-*d* of the UE 115 may be used for a transmission on a frequency of the FDM. As illustrated in FIG. 3C, panel 305-*e* and panel 305-*f* of the UE 115 may be used for a transmission during a time of the TDM. In some aspects, a panel 305 may refer to a special panel ID (e.g., a lower panel ID), with a special CORESET pool index (e.g., a lower CORESET pool index), with a special SRS ID (e.g., a lower SRS set index), with a special close loop index (e.g., a lower closed loop index), and the like.

In some cases, the UE 115 may identify a configuration to perform multi-panel communications (e.g., with any combination of panel 305-*a* through panel 305-*f*) using an indicated slot format for each panel 305-*a* through panel 305-*f*. The UE 115 may transmit or receive the transmissions using the panels 305 based on the indicated slot format for each panel 305. More particularly and with reference to transmit panel configuration 300-*a* of FIG. 3A, the multi-panel communications may utilize SDM techniques such that a first transmission using panel 305-*a* is transmitted or received using a first spatial configuration. A second transmission using panel 305-*b* may be transmitted using a second spatial configuration that is different from the first spatial configuration. For example, the first spatial configuration may use different beamforming configurations for the first transmission than the second spatial configuration uses for the second transmission. Thus, the UE 115 may transmit or receive the first transmission using panel 305-*a* at the same time (e.g., in parallel) and using the same frequency resources for transmitting or receiving the second transmission using panel 305-*b*.

With reference to transmit panel configuration 300-*b* of FIG. 3B, the multi-panel communications may utilize FDM techniques such that the first transmission using panel 305-*c* is transmitted or received using a first frequency. The second transmission using panel 305-*d* may be transmitted or received using a second frequency that is different from the first frequency. For example, the first frequency and the second frequency may have different subcarriers, carriers, bandwidth, bandwidth parts (BWPs), and the like, being used for the first transmission and the second transmission. Thus, the UE 115 may transmit or receive the first transmission using panel 305-*c* at the same time (e.g., in parallel), but using different frequency resources for transmitting or receiving the second transmission using panel 305-*d*.

With reference to transmit panel configuration 300-*c* of FIG. 3C, the multi-panel communications may utilize TDM techniques such that the first transmission using 305-*e* is transmitted or received at a first time period. The second transmission using panel 305-*f* may be transmitted or received at a second time period that is different from the first time period. For example, the first time period and the second time period may have different symbols, mini-slots, slots, transmission opportunities, transmission occasions, and the like, being used for the first transmission and the second transmission. Thus, the UE 115 may transmit or receive the first transmission using panel 305-*e* at a different time (e.g., consecutively), but using the same frequency resources for transmitting or receiving the second transmission using panel 305-*f*.

Accordingly, the UE 115 may perform the multi-panel communications with the base station 105 using panels 305 according to slot formats for each panel. The UE 115, the base station 105, or both, may transmit or receive and process a multi-panel transmission according to the techniques discussed herein (e.g., according to the slot format indicated to the UE 115). The multi-panel communications may utilize SDM techniques, FDM techniques, TDM techniques, alone or in any combination (i.e., SDM and FDM, FDM and TDM, SDM and TDM, or SDM, FDM, and TDM).

Figure 4:
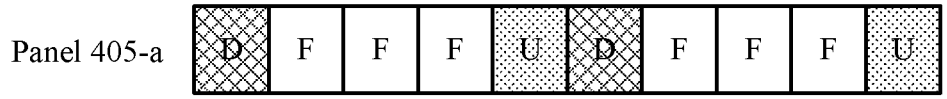
FIG. 4 illustrates an example of a slot format diagram that supports panel-specific slot format indication in accordance with aspects of the present disclosure.
Figure 4:
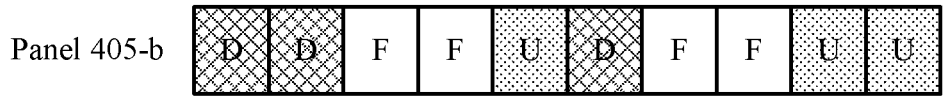
Figure 4:
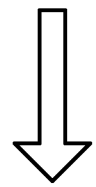
Figure 4:
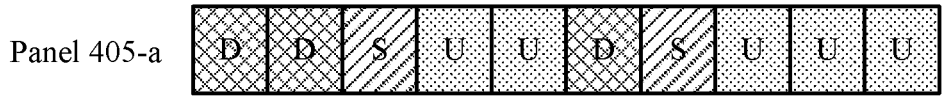
Figure 4:
Figure 4:
Figure 4:
Figure 4:
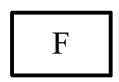
Figure 4:

FIG. 4 illustrates an example of a slot format diagram 400 that supports panel-specific slot format indication in accordance with aspects of the present disclosure. In some examples, slot format diagram 400 may implement aspects of wireless communications systems 100 or 200 and may include panels 405, which may be examples of a panel 205 or a panel 305 as described with reference to FIGS. 2 and 3. For example, the slot format diagram 400 may be implemented by a UE 115, a base station 105, or both, in combination with multi-panel communication to improve resource allocation. In some cases, a UE 115 may identify a configuration for performing multi-panel communication and may receive a slot format for each panel 405 from a base station 105. As illustrated in FIG. 4, the base station 105 may transmit the slot format in a common configuration 410, in a dedicated configuration 415, or a both.

In some cases, the base station 105 may transmit the common configuration 410 (e.g., as a set of TDD-DL-UL-ConfigurationCommon parameters), the dedicated configuration 415 (e.g., as a set of TDD-DL-UL-Configuration-Dedicated parameters), or both, to the UE 115 via RRC signaling, or a MAC-CE, or the like. The common configuration 410 may include a pattern of downlink slots 420, uplink slots 425, or flexible slots 430. For example, the common configuration 410 may include a pattern 1 (e.g., a first TDD pattern), a pattern 2 (e.g., a second TDD pattern), or both. The UE 115 may set the slot format per slot over a number of slots as indicated by the patterns. For example, the UE 115 may determine a first number of slots correspond to pattern1 and a second number of slots correspond to pattern 2. In some cases, the base station 105 may transmit a common configuration 410 for each panel 405 to the UE 115. For example, panel 405-*a* may have a first common configuration 410 corresponding to a first pattern (e.g., a pattern of downlink slots 420, uplink slots 425, and flexible slots 430 as illustrated for panel 405-*a*). Panel 405-*b* may have a second common configuration 410 corresponding to a second pattern (e.g., a pattern of downlink slots 420, uplink slots 425, and flexible slots 430 as illustrated for panel 405-*b*). In some cases, the first common configuration 410 for panel 405-*a* may be different than the second common configuration 410 for panel 405-*b*. For example, the communication direction for one or more symbols in one or more slots for panel 405-*b* may be different than the communication direction for one or more symbols in one or more slots for panel 405-*a*.

In some cases, the base station 105 may configure the UE 115 with a dedicated configuration 415 for each panel 405 (e.g., panel 405-*a* and panel 405-*b*), which may modify the flexible symbols in flexible slots 430 of the common configuration 410. For example, the dedicated configuration 415 may set the flexible slots 430 of the common configurations 410 associated with panel 405-*a* and panel 405-*b* to downlink slots 420, uplink slots 425, or special slots 435. In some cases, a special slot 435 may include uplink symbols, downlink symbols, one or more guard periods (e.g., when switching from downlink to uplink), or a combination. In some cases, the special slot 435 may have three parts: a first part including one or more symbols which have a same direction (i.e., downlink, uplink, or flexible) as symbols in a previous slot, a second part including one or more symbols which are either flexible or not used and may serve as the guard period, and a third part including one or more symbols which have a same direction as symbols in a subsequent slot.

Figure 5A:
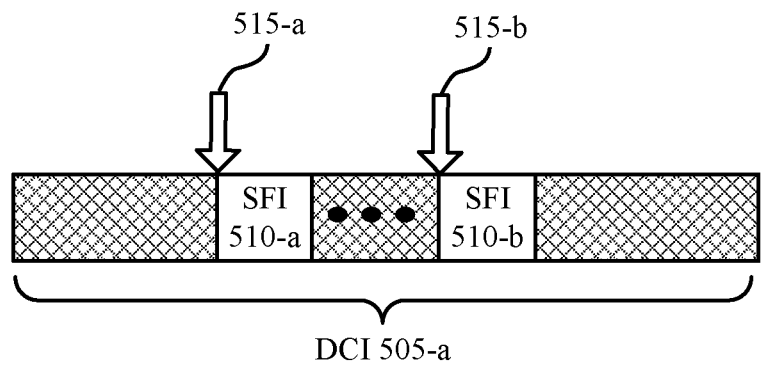
FIGS. 5A and 5B illustrate examples of a control diagram that supports panel-specific slot format indication in accordance with aspects of the present disclosure.
Figure 5B:
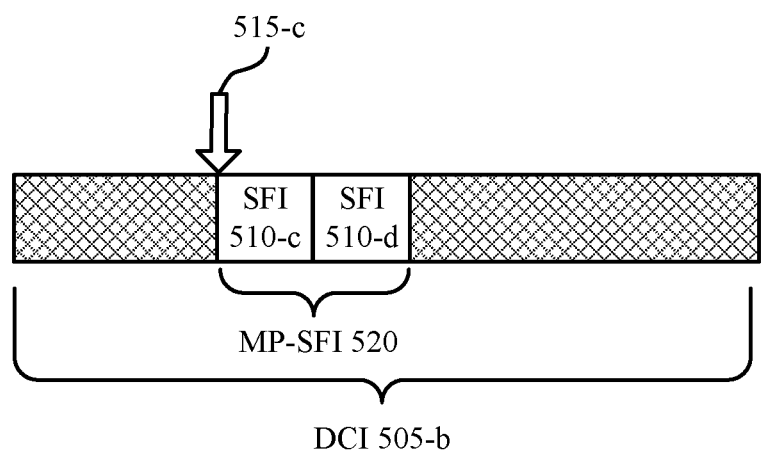

FIGS. 5A and 5B illustrate examples of control diagrams 500 that support panel-specific slot format indication in accordance with aspects of the present disclosure. In some examples, control diagrams 500 may implement aspects of wireless communications system 100 or 200. In some cases, a UE 115 may be configured by a base station 105 to receive a slot format indication for each panel (e.g., a panel 205 or 305 as described with reference to FIGS. 2 and 3) in multi-panel communications with the base station 105. For example, the base station 105 may configure the UE 115 to monitor a DCI 505 for an SFI 510 for each panel used in the multi-panel communications. The UE 115 may receive the DCI 505 from the base station 105 with the SFI 510 for each panel based on the monitoring.

In some cases, as illustrated in FIG. 5A, a base station 105 may configure a UE 115 to monitor multiple locations in a DCI 505. For example, the base station 105 may transmit position indication 515-*a* corresponding to the location of SFI 510-*a* (e.g., corresponding to a first panel) and position indication 515-*b* corresponding to the location of SFI 510-*b* (e.g., corresponding to a second panel) in DCI 505-*a*. The UE 115 may monitor DCI 505-*a* for SFI 510-*a* and SFI 510-*b* based on position indication 515-*a* and position indication 515-*b* respectively.

Additionally or alternatively, as illustrated in FIG. 5B, the base station 105 may configure the UE 115 to monitor a location in a DCI 505 for a multi-panel SFI (MP-SFI) block 520, which may include an SFI 510 for each panel used in multi-panel communications between the UE 115 and the base station 105. For example, the base station 105 may transmit position indication 515-*c* (e.g., a single position indication) that corresponds to the start point of the MP-SFI block 520. The MP-SFI block 520 may include SFI 510-*c* and SFI 510-*d*, as well as any number of SFIs 510 for panels. The UE 115 may monitor DCI 505-*b* for SFI 510-*c* and SFI 510-*d* based on position indication 515-*c*. In some cases, transmitting a position indication 515 for an MP-SFI block 520 may reduce signaling overhead when compared with transmitting position indications 515 for each SFI 510.

Figure 6:
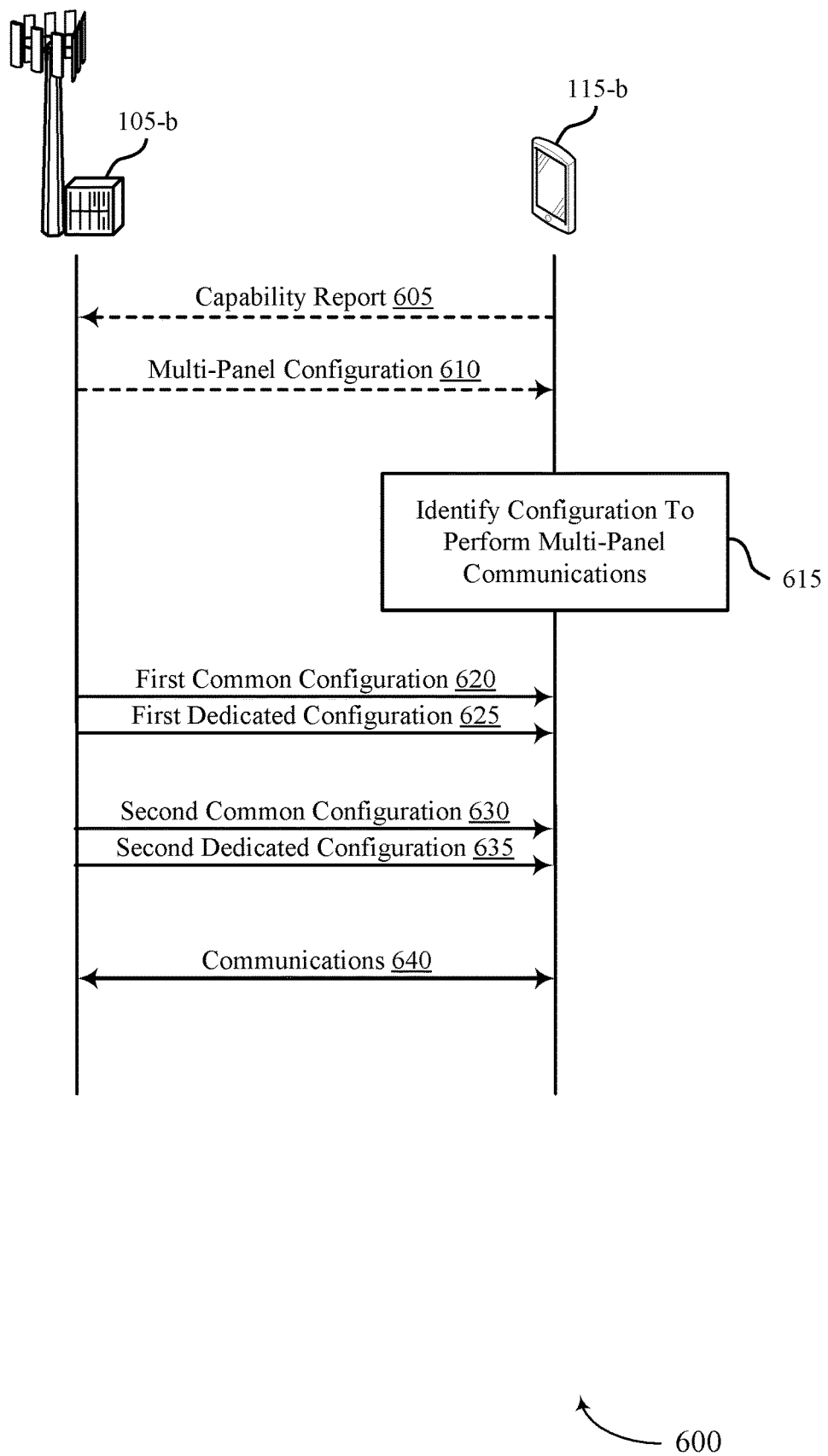
FIGS. 6 and 7 illustrate examples of a process flow that supports panel-specific slot format indication in accordance with aspects of the present disclosure.

FIG. 6 illustrates an example of a process flow 600 that supports panel-specific slot format indication in accordance with aspects of the present disclosure. In some examples, process flow 600 may implement aspects of wireless communications system 100 or 200 as well as panel configurations 300, slot format diagram 400, or control diagrams 500. The process flow 600 may illustrate an example of a UE 115, such as UE 115-*b*, or a base station 105, such as base station 105-*b*, performing multi-panel communication based on a slot format for each panel. Alternative examples of the following may be implemented, where some processes are performed in a different order than described or are not performed. In some cases, processes may include additional features not mentioned below, or further processes may be added.

At 605, UE 115-*b* may transmit a capability report including a message indicating the capability of UE 115-*b* to perform the multi-panel communications.

At 610, base station 105-*b* may transmit an indication of a multi-panel configuration to UE 115-*b*. In some cases, the indication may correspond to the method by which UE 115-*b* receives a slot format for each panel used for multi-panel communication with base station 105-*b*. For example, the configuration may indicate the slot format is indicated to UE 115-*b* via higher layer signaling (e.g., RRC signaling, a MAC-CE, or the like) in a common configuration and a dedicated configuration.

At 615, UE 115-*b* may identify the configuration of UE 115-*b* to perform the multi-panel communications with base station 105-*b* (e.g., based on receiving the multi-panel configuration at 610). In some cases, UE 115-*b* may use a first panel and a second panel of UE 115-*b* for the multi-panel communications. In some examples, the configuration may be based on the configuration report transmitted at 605.

At 620 and 625, UE 115-*b* may receive a first indication of a first slot format for the first panel for a time period. For example, UE 115-*b* may receive a first common configuration at 620 and a first dedicated configuration at 625 that indicate the first slot format for the first panel.

At 630 and 635, UE 115-*b* may receive a second indication of a second slot format for the second panel for the time period. For example, UE 115-*b* may receive a second common configuration at 630 and a second dedicated configuration at 635 that indicate the second slot format for the second panel. In some cases, at least one symbol for the first slot format for the first panel may have a different communication direction than for the second slot format for the second panel. That is, the common configuration at 620 may be different than the common configuration at 630, the dedicated configuration 625 may be different than the dedicated configuration at 635, or both.

At 640, UE 115-*b* may communicate with base station 105-*b* for the time period using the first panel according to the first slot format and using the second panel according to the second slot format. For example, UE 115-*b* may perform an SRS transmission, a PUCCH transmission, a PUSCH transmission, a physical random access channel (PRACH) transmission, or a combination using the first panel and the second panel. In some cases, UE 115-*b* may transmit a first uplink transmission or receive a first downlink transmission using the first panel according to the first slot format. UE 115-*b* may transmit a second uplink transmission or receive a second downlink transmission using the second panel according to the second slot format. That is, UE 115-*b* may use the first panel and the second panel for downlink or uplink communications (e.g., transmitting or receiving).

Figure 7:
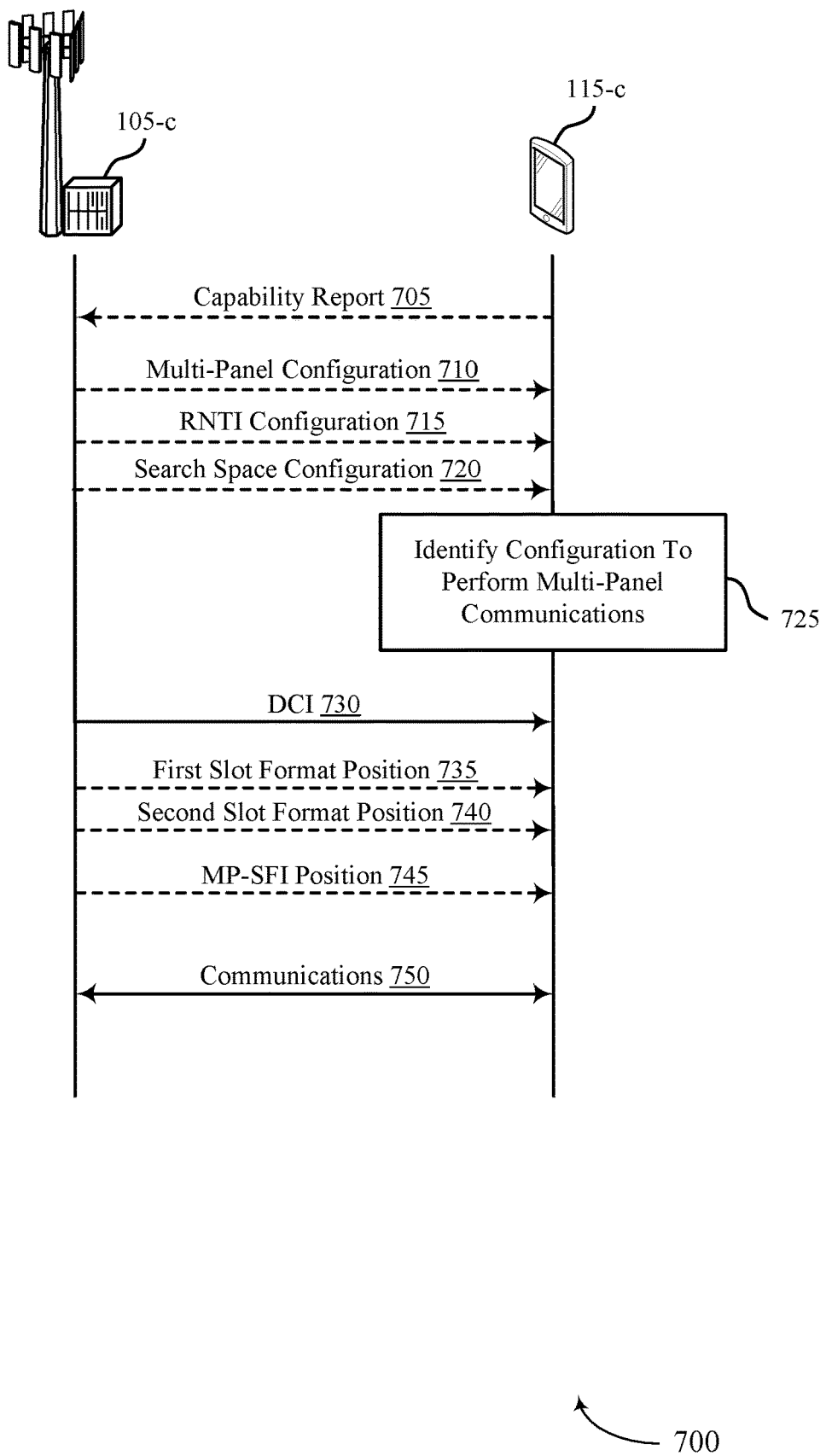

FIG. 7 illustrates an example of a process flow 700 that supports panel-specific slot format indication in accordance with aspects of the present disclosure. In some examples, process flow 700 may implement aspects of wireless communications system 100 or 200 as well as panel configurations 300, slot format diagram 400, or control diagrams 500. The process flow 700 may illustrate an example of a UE 115, such as UE 115-*c*, or a base station 105, such as base station 105-*c*, performing multi-panel communication based on a slot format for each panel. Alternative examples of the following may be implemented, where some processes are performed in a different order than described or are not performed. In some cases, processes may include additional features not mentioned below, or further processes may be added.

At 705, UE 115-*c* may transmit a capability report including a message indicating the capability of UE 115-*c* to perform the multi-panel communications.

At 710, base station 105-*c* may transmit an indication of a multi-panel configuration to UE 115-*c*. In some cases, the indication may correspond to the method by which UE 115-*c* receives a slot format for each panel used for multi-panel communication with base station 105-*c*. For example, the configuration may indicate the slot format is indicated to UE 115-*c* via lower layer signaling (e.g., a DCI message or the like) in an SFI.

At 715, UE 115-*c* may receive a configuration identifying a first RNTI associated with a first panel and a second RNTI associated with a second panel. At 720, UE 115-*c* may receive a configuration identifying a first control search space associated with the first panel and a second control search space associated with the second panel.

At 725, UE 115-*c* may identify the configuration of UE 115-*c* to perform the multi-panel communications with base station 105-*c* (e.g., based on receiving the multi-panel configuration at 710). In some cases, UE 115-*c* may use the first panel and the second panel of UE 115-*c* for the multi-panel communications. In some examples, the configuration may be based on the configuration report transmitted at 705.

At 730, base station 105-*c* may transmit a DCI message including a first indication of a first slot format for the first panel for a time period and a second indication of a second slot format for the time period. In some cases, at least one symbol for the first slot format for the first panel may have a different communication direction than for the second slot format for the second panel (e.g., the first slot format and the second slot format may be different). In some examples, UE 115-*c* may receive the first indication based on the first RNTI and the second indication based on the second RNTI. For example, UE 115-*c* may monitor a first DCI message including the first indication of the first slot format for the first panel based on the first RNTI and a second DCI message including the second indication of the second slot format for the second panel based on the second RNTI. In some other examples, UE 115-*c* may receive the first indication based on the first control search space and the second indication based on the second control search space. For example, UE 115-*c* may monitor a first control search space for a first DCI message including the first indication and a second control search space for a second DCI message including the second indication.

At 735, base station 105-*c* may transmit an indication of a first position corresponding to the first indication to UE 115-*c*. At 740, base station 105-*c* may transmit an indication of a second position corresponding to the second indication to UE 115-*c*. The UE 115-*c* may receive the first indication in the DCI at 730 based on the indicated first position and the second indication in the DCI at 730 based on the indicated second position.

Additionally or alternatively, at 745, base station 105-*c* may transmit an indication of a position of a MP-SFI block to UE 115-*c*. In some cases, the MP-SFI block may include an SFI for each panel in the multi-panel communication. For example, the first indication and the second indication may be received in the MP-SFI block in the DCI message according to the indicated position.

At 750, UE 115-*c* may communicate with base station 105-*c* for the time period using the first panel according to the first slot format and using the second panel according to the second slot format. For example, UE 115-*c* may perform an SRS transmission, a PUCCH transmission, a PUSCH transmission, a PRACH transmission, or a combination using the first panel and the second panel. In some cases, UE 115-*c* may transmit a first uplink transmission or receive a first downlink transmission using the first panel according to the first slot format. UE 115-*c* may transmit a second uplink transmission or receive a second downlink transmission using the second panel according to the second slot format. That is, UE 115-*c* may use the first panel and the second panel for downlink or uplink communications (e.g., transmitting or receiving).

Figure 8:
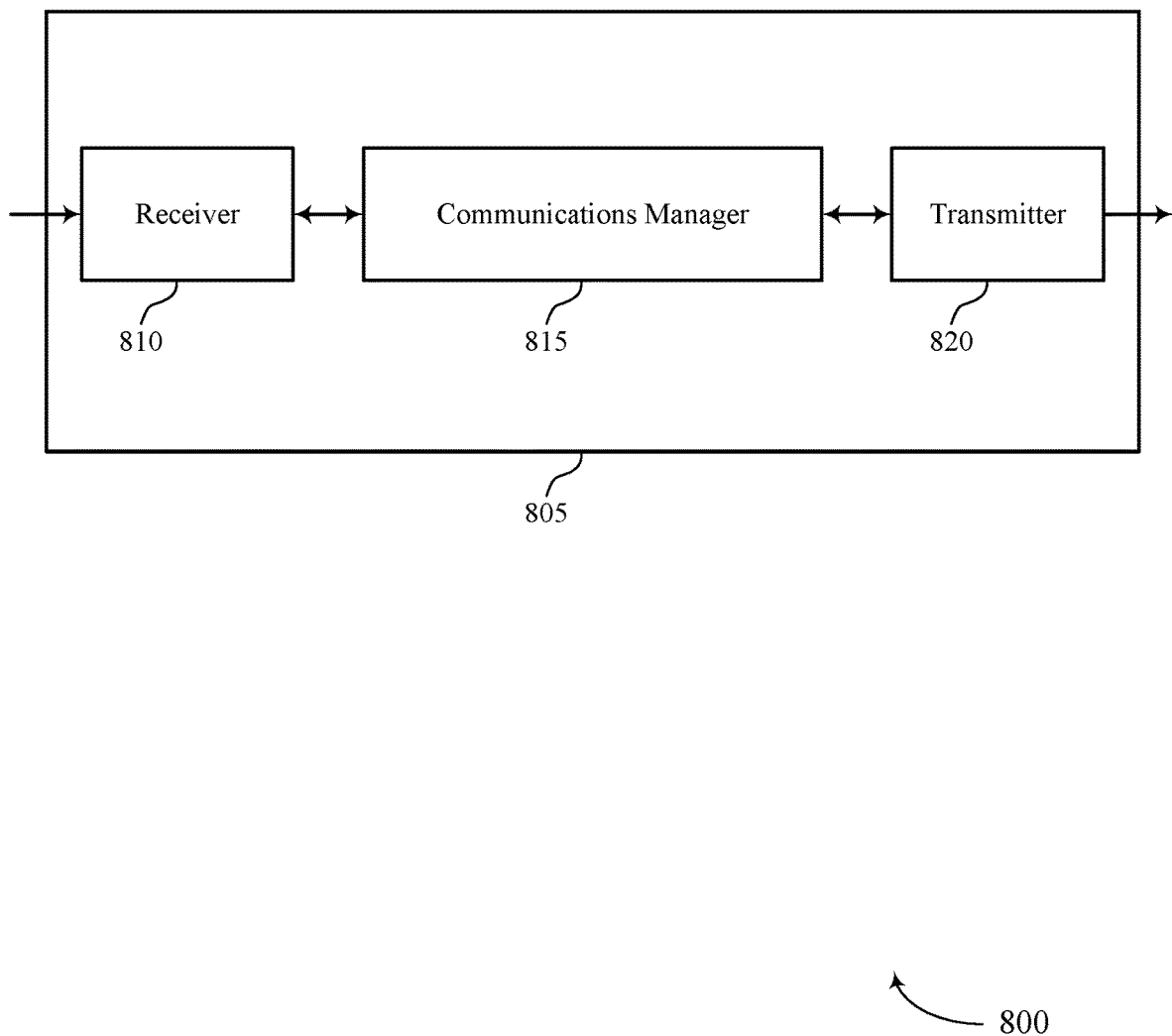
FIGS. 8 and 9 show block diagrams of devices that support panel-specific slot format indication in accordance with aspects of the present disclosure.

FIG. 8 shows a block diagram 800 of a device 805 that supports panel-specific slot format indication in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to panel-specific slot format indication, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may identify a configuration of the UE to perform multi-panel communications with a base station using at least a first panel and a second panel of the UE, receive a first indication of a first slot format for the first panel for a time period and a second indication of a second slot format for the second panel for the time period, at least one symbol for the first slot format for the first panel having a different communication direction than for the second slot format for the second panel, and communicate with the base station for the time period using the first panel according to the first slot format and using the second panel according to the second slot format. The communications manager 815 may be an example of aspects of the communications manager 1110 described herein.

The actions performed by the communications manager 815 as described herein may be implemented to realize one or more potential advantages. One implementation may enable a UE to receive an indication of a slot format for each panel used for multi-panel communications with a base station. The slot format indication may enable the UE to transmit and receive in multi-panel communications using the panels according to the different slot formats, which may improve resource allocation, among other advantages.

Based on implementing the slot format indication per panel as described herein, a processor of a UE or a base station (e.g., a processor controlling the receiver 810, the communications manager 815, the transmitter 820, or a combination thereof) may reduce the impact or likelihood of inefficient resource utilization due to multi-panel communications while ensuring relatively efficient communications. For example, the slot format indication techniques described herein may leverage a dedicated and common configuration slot format or SFI in a DCI for each panel, which may realize reduced volume of retransmissions and a better channel resources utilization, among other benefits.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signaling processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
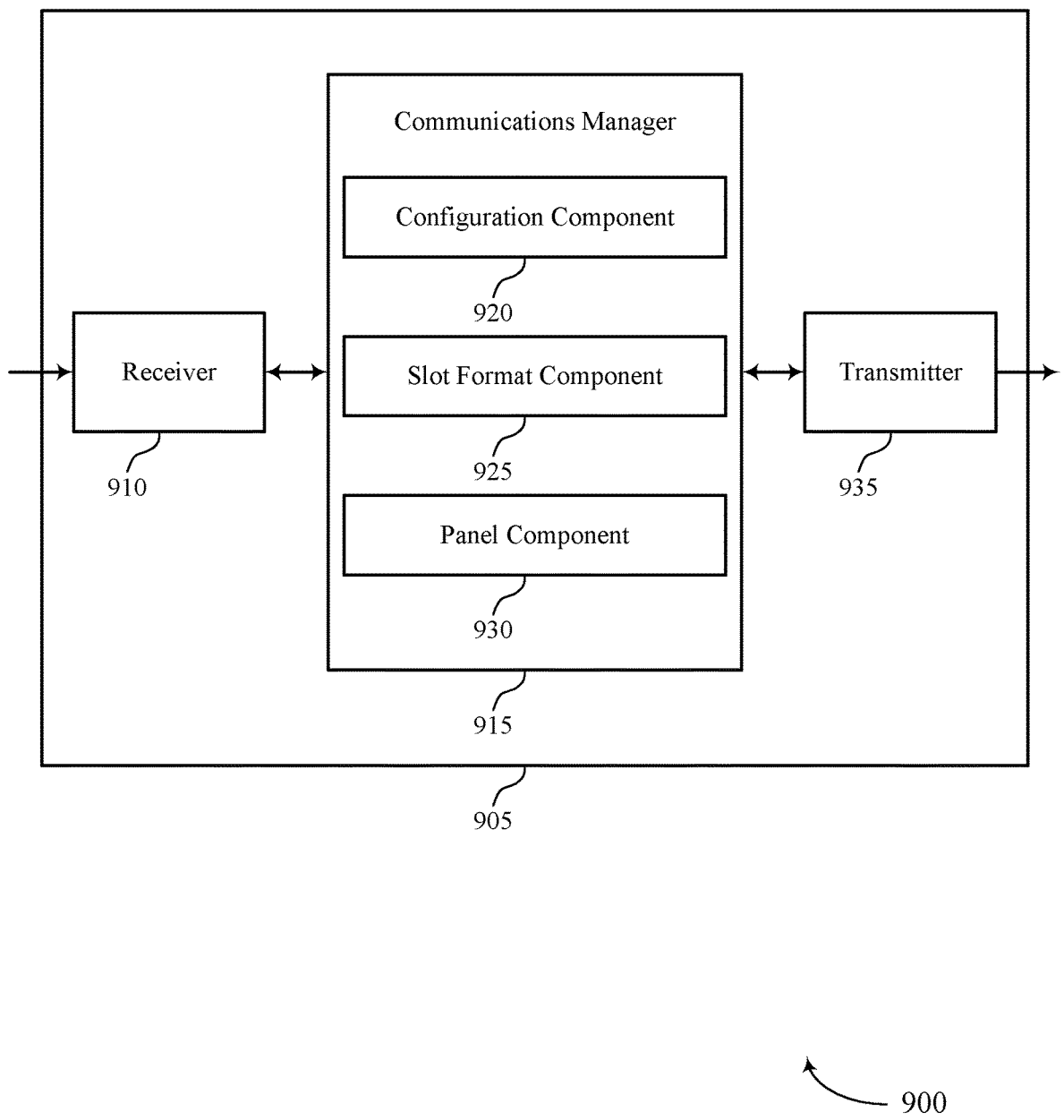

FIG. 9 shows a block diagram 900 of a device 905 that supports panel-specific slot format indication in accordance with aspects of the present disclosure. The device 905 may be an example of aspects of a device 805, or a UE 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to panel-specific slot format indication, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a configuration component 920, a slot format component 925, and a panel component 930. The communications manager 915 may be an example of aspects of the communications manager 1110 described herein.

The configuration component 920 may identify a configuration of the UE to perform multi-panel communications with a base station using at least a first panel and a second panel of the UE. The slot format component 925 may receive a first indication of a first slot format for the first panel for a time period and a second indication of a second slot format for the second panel for the time period, at least one symbol for the first slot format for the first panel having a different communication direction than for the second slot format for the second panel. The panel component 930 may communicate with the base station for the time period using the first panel according to the first slot format and using the second panel according to the second slot format.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
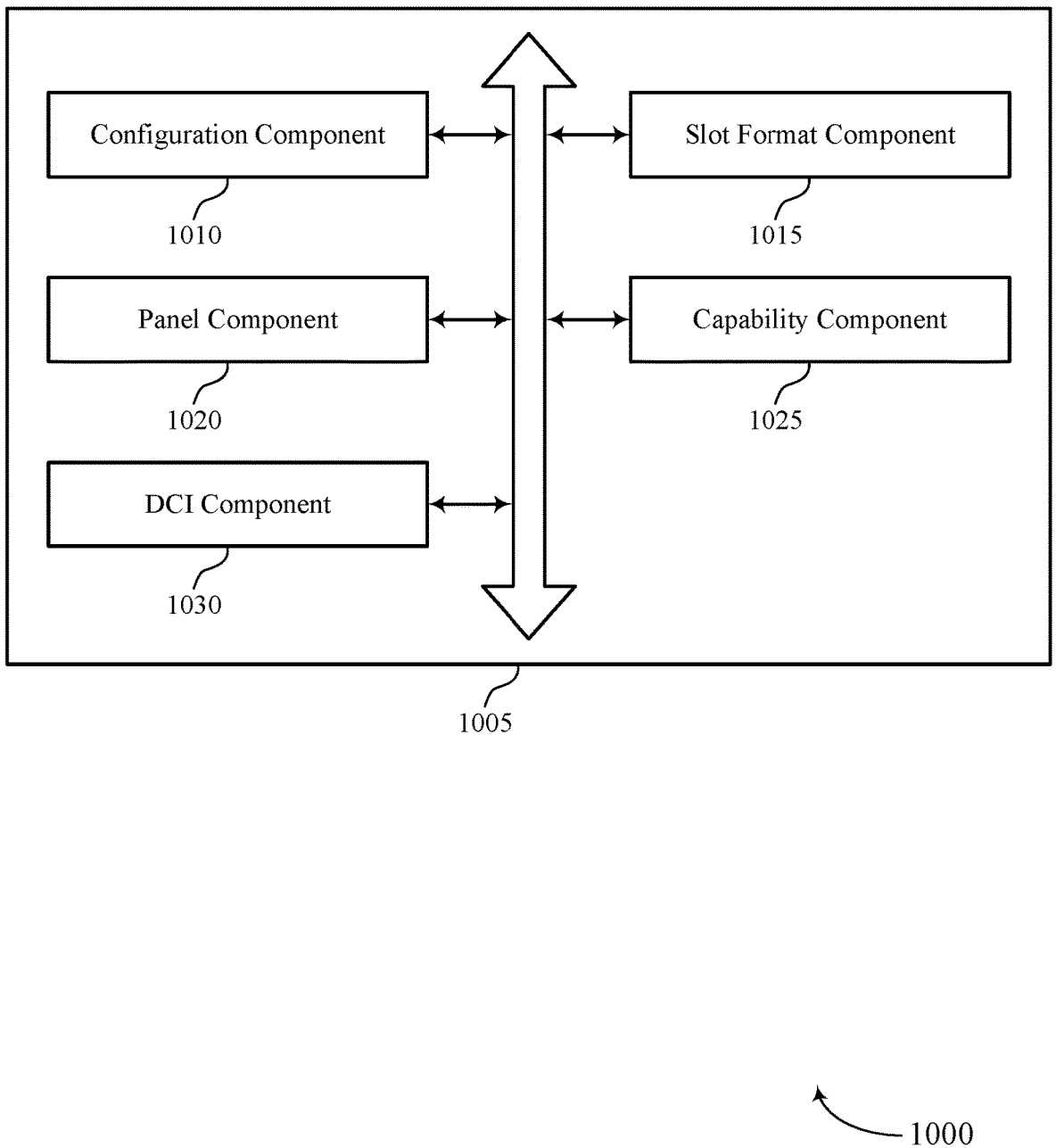
FIG. 10 shows a block diagram of a communications manager that supports panel-specific slot format indication in accordance with aspects of the present disclosure.

FIG. 10 shows a block diagram 1000 of a communications manager 1005 that supports panel-specific slot format indication in accordance with aspects of the present disclosure. The communications manager 1005 may be an example of aspects of a communications manager 815, a communications manager 915, or a communications manager 1110 described herein. The communications manager 1005 may include a configuration component 1010, a slot format component 1015, a panel component 1020, a capability component 1025, and a DCI component 1030. Each of these modules may communicate, directly or indirectly, with one another (e.g., via one or more buses).

The configuration component 1010 may identify a configuration of the UE to perform multi-panel communications with a base station using at least a first panel and a second panel of the UE. In some examples, the configuration component 1010 may receive a first common configuration and a first dedicated configuration that indicate the first slot format for the first panel. In some examples, the configuration component 1010 may receive a second common configuration and a second dedicated configuration that indicate the second slot format for the second panel. The slot format component 1015 may receive a first indication of a first slot format for the first panel for a time period and a second indication of a second slot format for the second panel for the time period, at least one symbol for the first slot format for the first panel having a different communication direction than for the second slot format for the second panel.

In some examples, the configuration component 1010 may receive a configuration identifying a first RNTI associated with the first panel and a second RNTI associated with the second panel, where the first indication is received based on the first RNTI, and the second indication is received based on the second RNTI. In some examples, the configuration component 1010 may monitor, according to the first RNTI based on the received configuration, for a first DCI message including the first indication of the first slot format for the first panel, the first indication received based on the monitoring according to the first RNTI.

In some examples, the configuration component 1010 may receive a configuration identifying a first control search space associated with the first panel and a second control search space associated with the second panel, where the first indication is received in the first control search space, and the second indication is received in the second control search space. In some examples, the configuration component 1010 may monitor, based on the received configuration, the first control search space for a first DCI message including the first indication of the first slot format for the first panel, the first indication received based on the monitoring the first control search space. In some examples, the configuration component 1010 may monitor, based on the received configuration, the second control search space for a second DCI message including the second indication of the second slot format for the second panel, the second indication received based on the monitoring the second control search space.

The panel component 1020 may communicate with the base station for the time period using the first panel according to the first slot format and using the second panel according to the second slot format. In some examples, communicating with the base station for the time period using the first panel and the second panel includes performing an SRS transmission, a PUCCH transmission, a PUSCH transmission, a PRACH transmission, or a combination thereof.

In some examples, the panel component 1020 may transmit a first uplink transmission or receiving a first downlink transmission using the first panel according to the first slot format. In some examples, the panel component 1020 may transmit a second uplink transmission or receiving a second downlink transmission using the second panel according to the second slot format.

The capability component 1025 may transmit a message indicating a capability of the UE to perform the multi-panel communications, the configuration based on the transmitted message indicating the capability.

The DCI component 1030 may receive a DCI message including the first indication of the first slot format for the first panel and the second indication of the second slot format for the second panel. In some examples, the DCI component 1030 may receive an indication of a first position corresponding to the first indication and an indication of a second position corresponding to the second indication, where the first indication is received in the DCI message according to the indicated first position, and the second indication is received in the DCI message according to the indicated second position. In some examples, the DCI component 1030 may receive an indication of a position of a multi-panel slot format indication block in the DCI message, where the first indication and the second indication are received in the multi-panel slot format indication block in the DCI message according to the indicated position.

Figure 11:
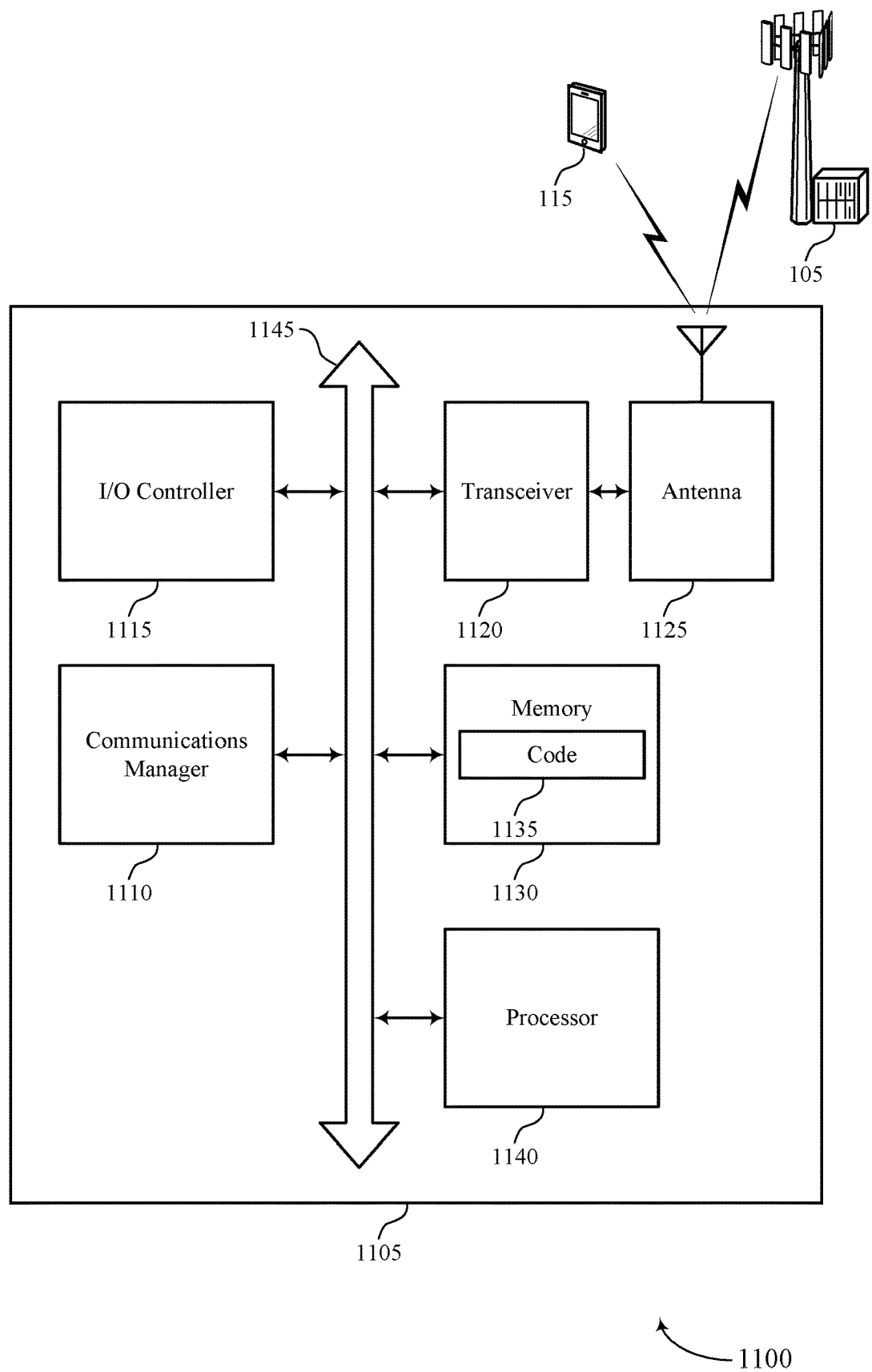
FIG. 11 shows a diagram of a system including a device that supports panel-specific slot format indication in accordance with aspects of the present disclosure.

FIG. 11 shows a diagram of a system 1100 including a device 1105 that supports panel-specific slot format indication in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may identify a configuration of the UE to perform multi-panel communications with a base station using at least a first panel and a second panel of the UE, receive a first indication of a first slot format for the first panel for a time period and a second indication of a second slot format for the second panel for the time period, at least one symbol for the first slot format for the first panel having a different communication direction than for the second slot format for the second panel, and communicate with the base station for the time period using the first panel according to the first slot format and using the second panel according to the second slot format.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic I/O system (BIOS) which may control basic hardware or software operation such as the interaction with peripheral components or devices.

The processor 1140 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting panel-specific slot format indication).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
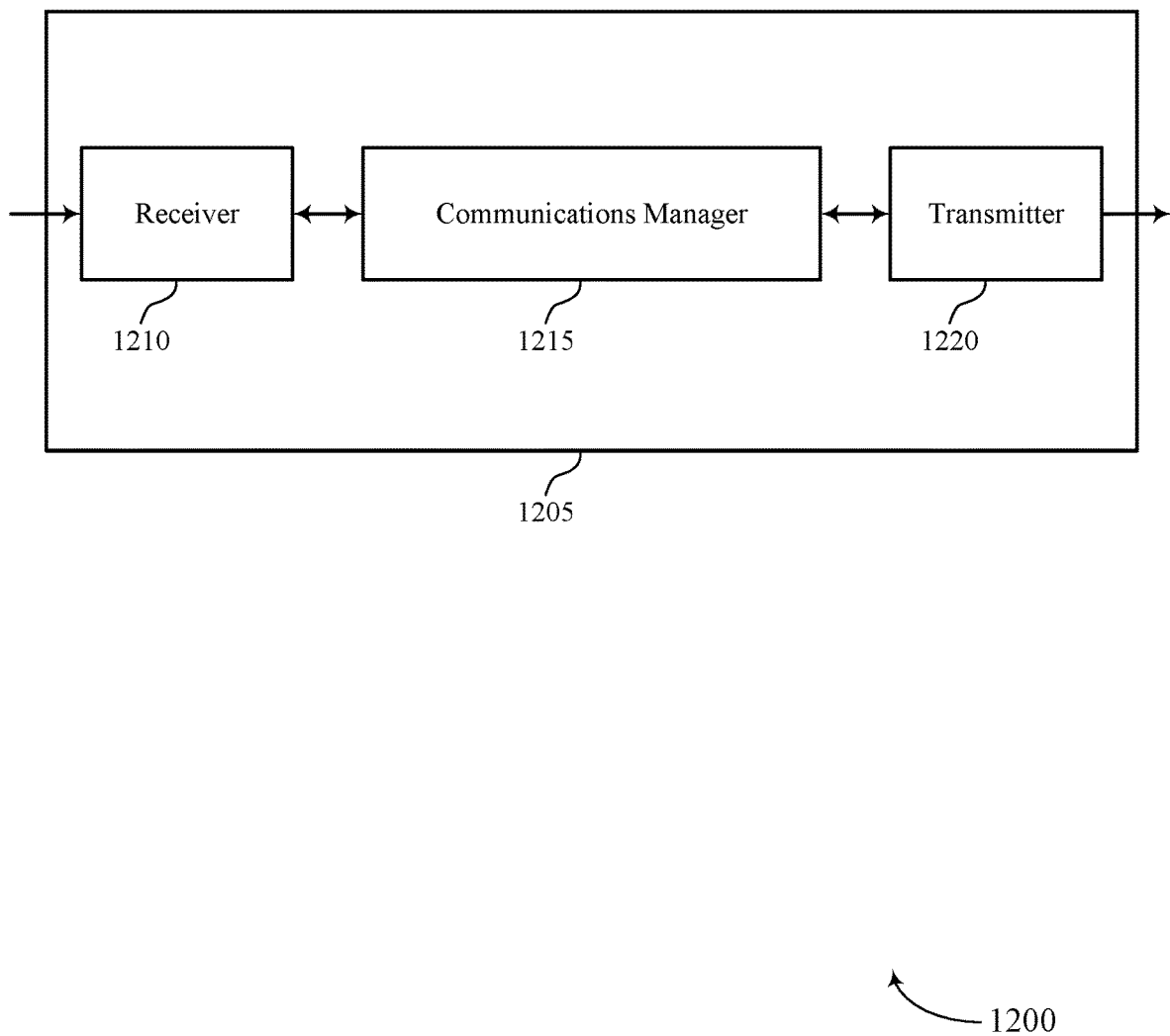
FIGS. 12 and 13 show block diagrams of devices that support panel-specific slot format indication in accordance with aspects of the present disclosure.

FIG. 12 shows a block diagram 1200 of a device 1205 that supports panel-specific slot format indication in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to panel-specific slot format indication, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may identify a configuration of a UE to perform multi-panel communications with the base station using at least a first panel and a second panel of the UE, transmit a first indication of a first slot format for the first panel for a time period and a second indication of a second slot format for the second panel for the time period, at least one symbol for the first slot format for the first panel having a different communication direction than for the second slot format for the second panel, and communicate with the UE for the time period using the first panel according to the first slot format and using the second panel according to the second slot format. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
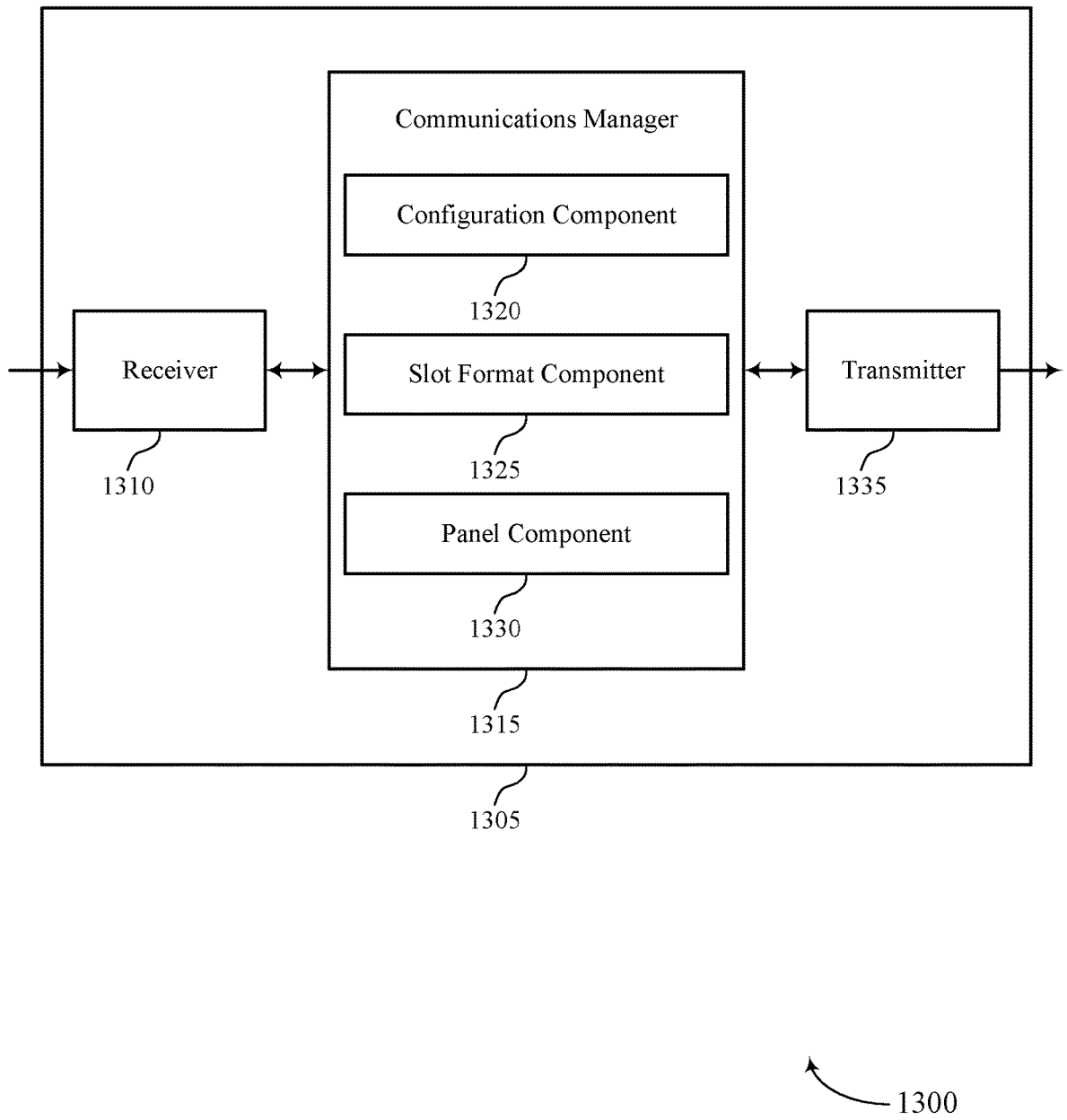

FIG. 13 shows a block diagram 1300 of a device 1305 that supports panel-specific slot format indication in accordance with aspects of the present disclosure. The device 1305 may be an example of aspects of a device 1205, or a base station 105 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to panel-specific slot format indication, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a configuration component 1320, a slot format component 1325, and a panel component 1330. The communications manager 1315 may be an example of aspects of the communications manager 1510 described herein.

The configuration component 1320 may identify a configuration of a UE to perform multi-panel communications with the base station using at least a first panel and a second panel of the UE. The slot format component 1325 may transmit a first indication of a first slot format for the first panel for a time period and a second indication of a second slot format for the second panel for the time period, at least one symbol for the first slot format for the first panel having a different communication direction than for the second slot format for the second panel. The panel component 1330 may communicate with the UE for the time period using the first panel according to the first slot format and using the second panel according to the second slot format.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
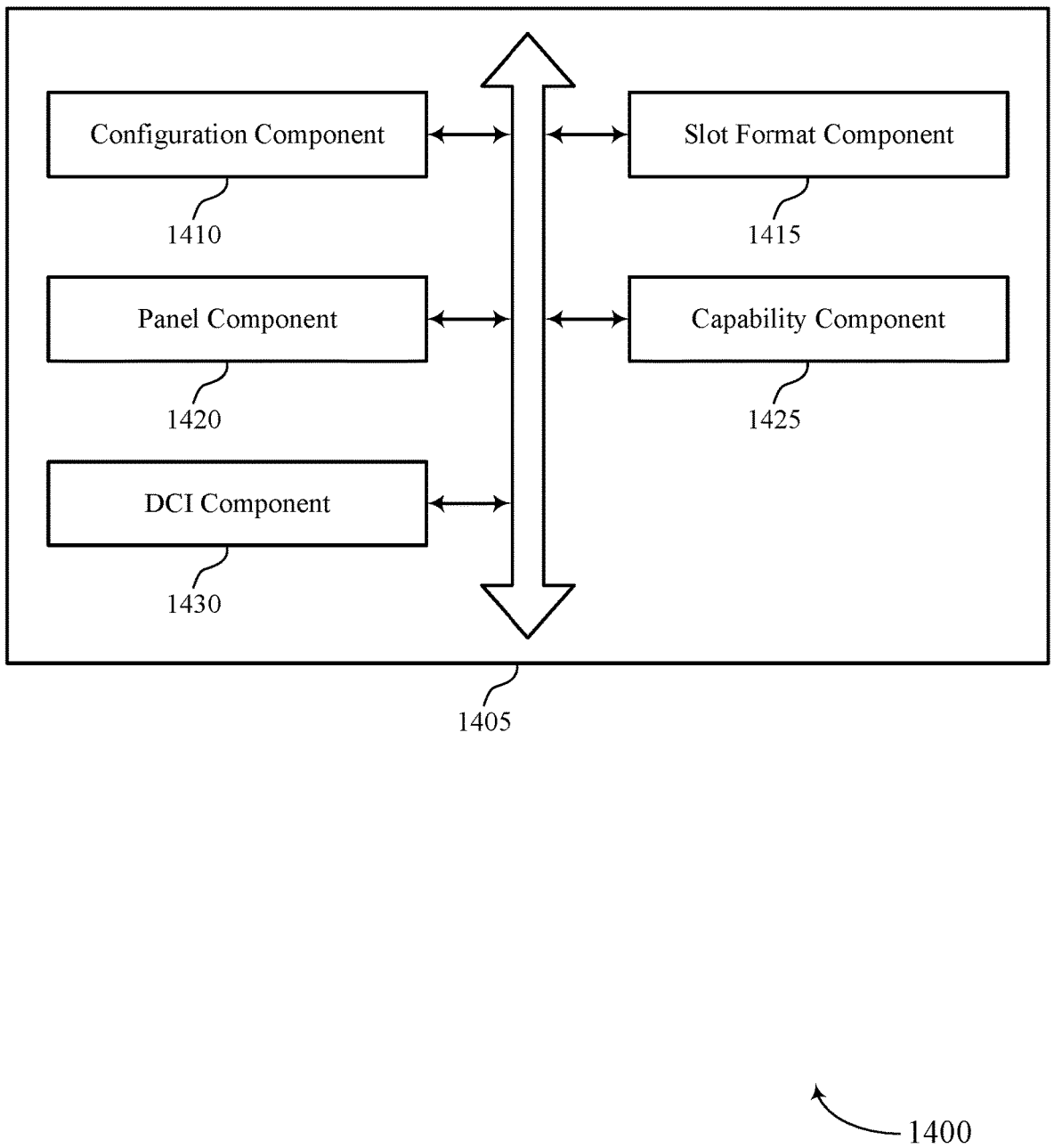
FIG. 14 shows a block diagram of a communications manager that supports panel-specific slot format indication in accordance with aspects of the present disclosure.

FIG. 14 shows a block diagram 1400 of a communications manager 1405 that supports panel-specific slot format indication in accordance with aspects of the present disclosure. The communications manager 1405 may be an example of aspects of a communications manager 1215, a communications manager 1315, or a communications manager 1510 described herein. The communications manager 1405 may include a configuration component 1410, a slot format component 1415, a panel component 1420, a capability component 1425, and a DCI component 1430. Each of these modules may communicate, directly or indirectly, with one another (e.g., via one or more buses).

The configuration component 1410 may identify a configuration of a UE to perform multi-panel communications with the base station using at least a first panel and a second panel of the UE. In some examples, the configuration component 1410 may transmit a first common configuration and a first dedicated configuration that indicate the first slot format for the first panel. In some examples, the configuration component 1410 may transmit a second common configuration and a second dedicated configuration that indicate the second slot format for the second panel.

The slot format component 1415 may transmit a first indication of a first slot format for the first panel for a time period and a second indication of a second slot format for the second panel for the time period, at least one symbol for the first slot format for the first panel having a different communication direction than for the second slot format for the second panel.

In some examples, the configuration component 1410 may transmit a configuration identifying a first RNTI associated with the first panel and a second RNTI associated with the second panel, where the first indication is transmitted based on the first RNTI, and the second indication is transmitted based on the second RNTI. In some examples, the configuration component 1410 may transmit a configuration identifying a first control search space associated with the first panel and a second control search space associated with the second panel, where the first indication is transmitted in the first control search space, and the second indication is transmitted in the second control search space.

The panel component 1420 may communicate with the UE for the time period using the first panel according to the first slot format and using the second panel according to the second slot format.

In some examples, communicating with the UE for the time period using the first panel and the second panel includes receiving an SRS transmission, a PUCCH transmission, a PUSCH transmission, a PRACH transmission, or a combination thereof.

In some examples, the panel component 1420 may receive, from the UE, a first uplink transmission or transmitting, to the UE, a first downlink transmission using the first panel according to the first slot format. In some examples, the panel component 1420 may receive, from the UE, a second uplink transmission or transmitting, to the UE, a second downlink transmission using the second panel according to the second slot format.

The capability component 1425 may receive, from the UE, a message indicating a capability of the UE to perform the multi-panel communications, the configuration based on the received message indicating the capability.

The DCI component 1430 may transmit a DCI message including the first indication of the first slot format for the first panel and the second indication of the second slot format for the second panel. In some examples, the DCI component 1430 may transmit an indication of a first position corresponding to the first indication and an indication of a second position corresponding to the second indication, where the first indication is transmitted in the DCI message according to the indicated first position, and the second indication is transmitted in the DCI message according to the indicated second position. In some examples, the DCI component 1430 may transmit an indication of a position of a multi-panel slot format indication block in the DCI message, where the first indication and the second indication are transmitted in the multi-panel slot format indication block in the DCI message according to the indicated position.

Figure 15:
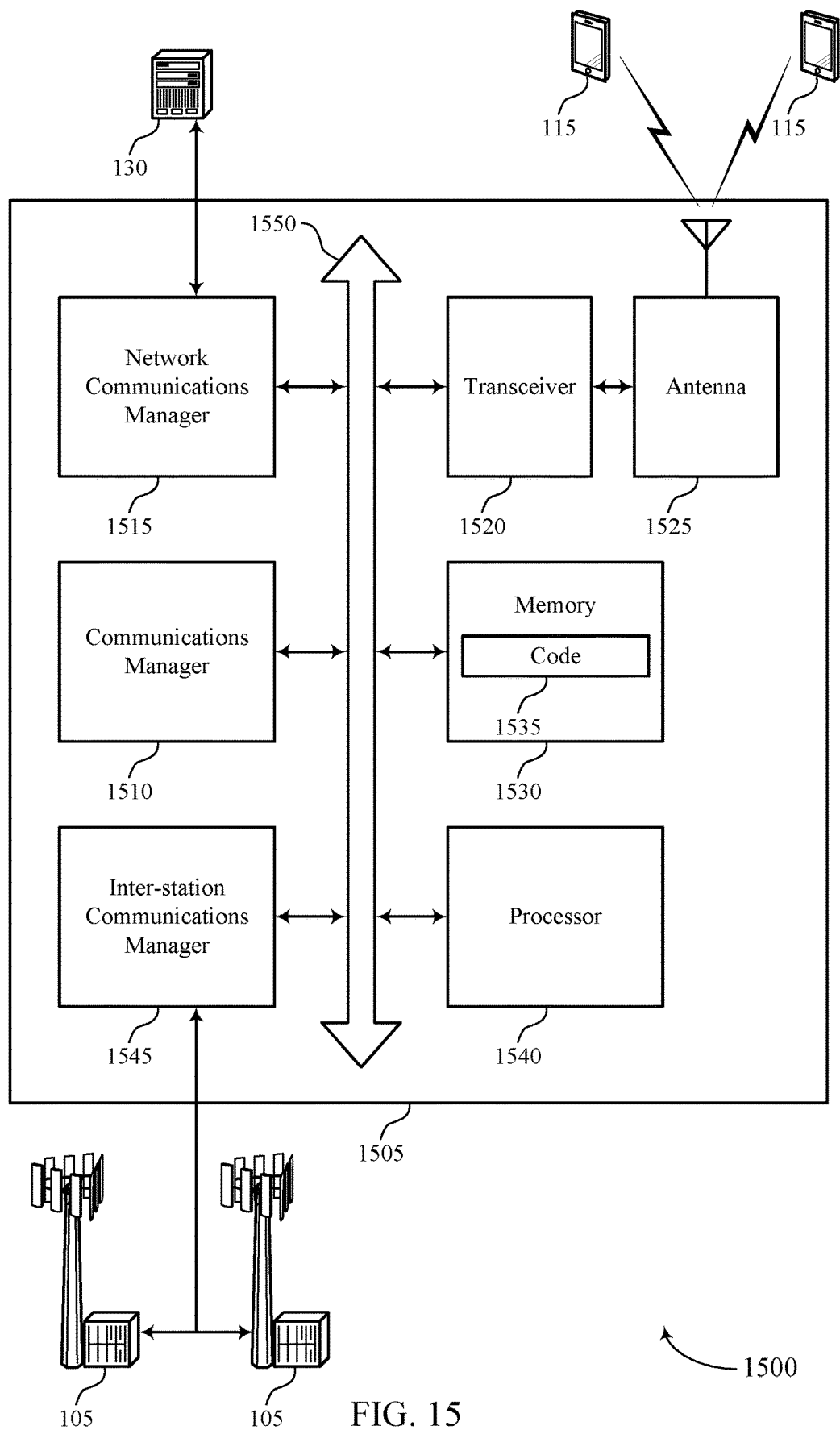
FIG. 15 shows a diagram of a system including a device that supports panel-specific slot format indication in accordance with aspects of the present disclosure.

FIG. 15 shows a diagram of a system 1500 including a device 1505 that supports panel-specific slot format indication in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may identify a configuration of a UE to perform multi-panel communications with the base station using at least a first panel and a second panel of the UE, transmit a first indication of a first slot format for the first panel for a time period and a second indication of a second slot format for the second panel for the time period, at least one symbol for the first slot format for the first panel having a different communication direction than for the second slot format for the second panel, and communicate with the UE for the time period using the first panel according to the first slot format and using the second panel according to the second slot format.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting panel-specific slot format indication).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
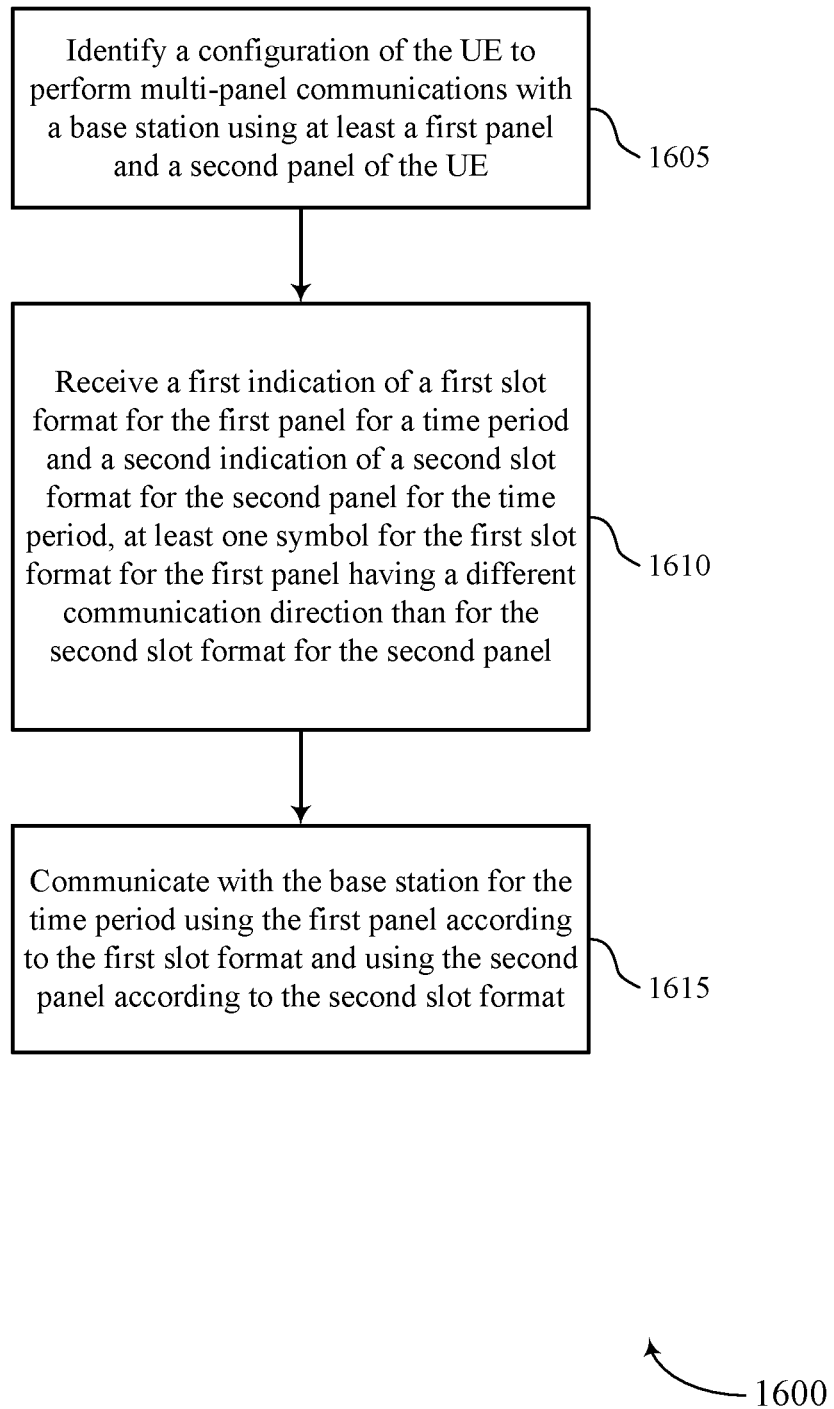
FIGS. 16 through 20 show flowcharts illustrating methods that support panel-specific slot format indication in accordance with aspects of the present disclosure.

FIG. 16 shows a flowchart illustrating a method 1600 that supports panel-specific slot format indication in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may identify a configuration of the UE to perform multi-panel communications with a base station using at least a first panel and a second panel of the UE. The operations of 1605 may be performed according to the methods described herein. In some examples, aspects of the operations of 1605 may be performed by a configuration component as described with reference to FIGS. 8 through 11.

At 1610, the UE may receive a first indication of a first slot format for the first panel for a time period and a second indication of a second slot format for the second panel for the time period, at least one symbol for the first slot format for the first panel having a different communication direction than for the second slot format for the second panel. The operations of 1610 may be performed according to the methods described herein. In some examples, aspects of the operations of 1610 may be performed by a slot format component as described with reference to FIGS. 8 through 11.

At 1615, the UE may communicate with the base station for the time period using the first panel according to the first slot format and using the second panel according to the second slot format. The operations of 1615 may be performed according to the methods described herein. In some examples, aspects of the operations of 1615 may be performed by a panel component as described with reference to FIGS. 8 through 11.

Figure 17:
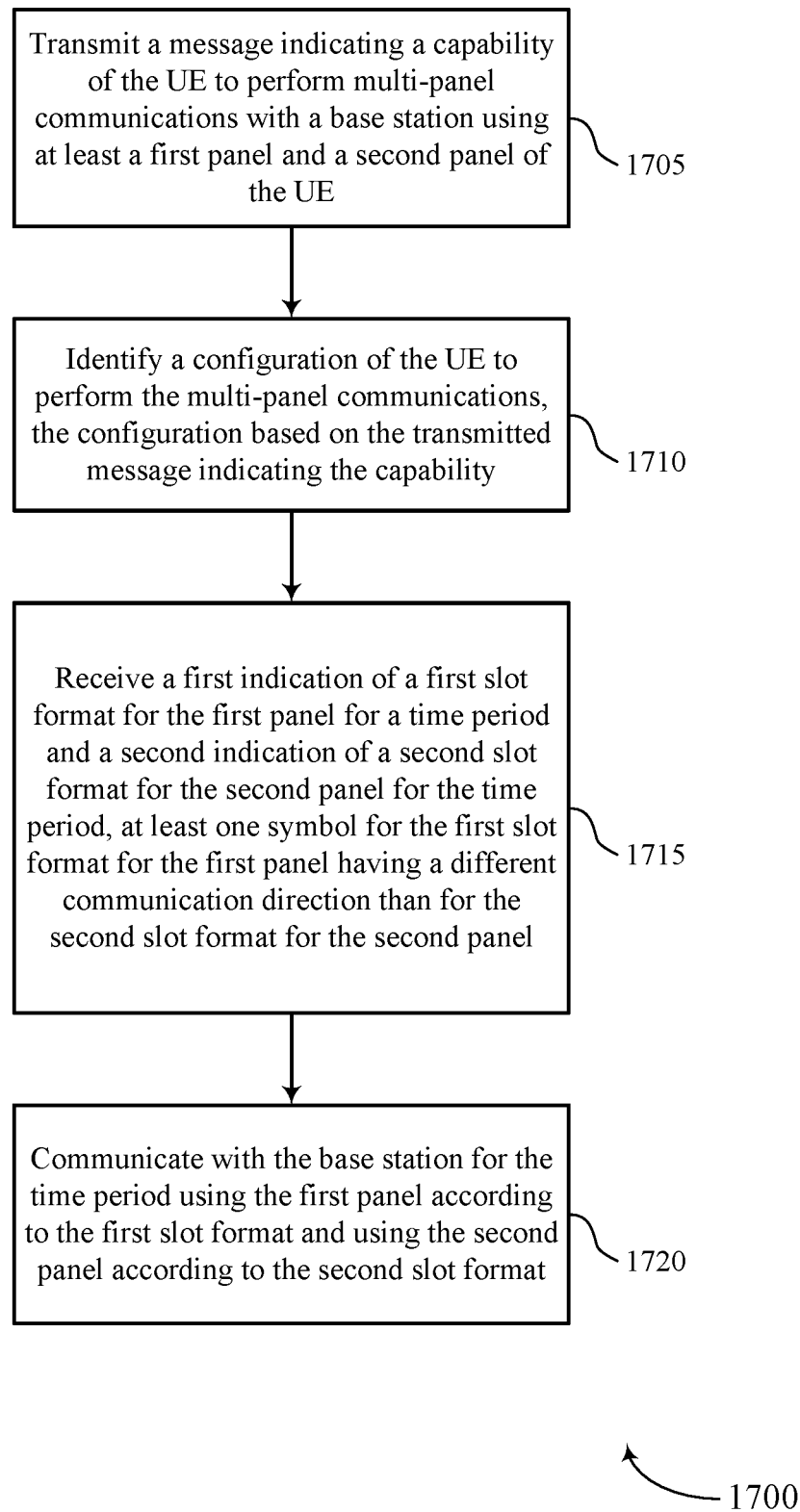

FIG. 17 shows a flowchart illustrating a method 1700 that supports panel-specific slot format indication in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may transmit a message indicating a capability of the UE to perform multi-panel communications with a base station using at least a first panel and a second panel of the UE. The operations of 1705 may be performed according to the methods described herein. In some examples, aspects of the operations of 1705 may be performed by a capability component as described with reference to FIGS. 8 through 11.

At 1710, the UE may identify a configuration of the UE to perform the multi-panel communications, the configuration based on the transmitted message indicating the capability. The operations of 1710 may be performed according to the methods described herein. In some examples, aspects of the operations of 1710 may be performed by a configuration component as described with reference to FIGS. 8 through 11.

At 1715, the UE may receive a first indication of a first slot format for the first panel for a time period and a second indication of a second slot format for the second panel for the time period, at least one symbol for the first slot format for the first panel having a different communication direction than for the second slot format for the second panel. The operations of 1715 may be performed according to the methods described herein. In some examples, aspects of the operations of 1715 may be performed by a slot format component as described with reference to FIGS. 8 through 11.

At 1720, the UE may communicate with the base station for the time period using the first panel according to the first slot format and using the second panel according to the second slot format. The operations of 1720 may be performed according to the methods described herein. In some examples, aspects of the operations of 1720 may be performed by a panel component as described with reference to FIGS. 8 through 11.

Figure 18:
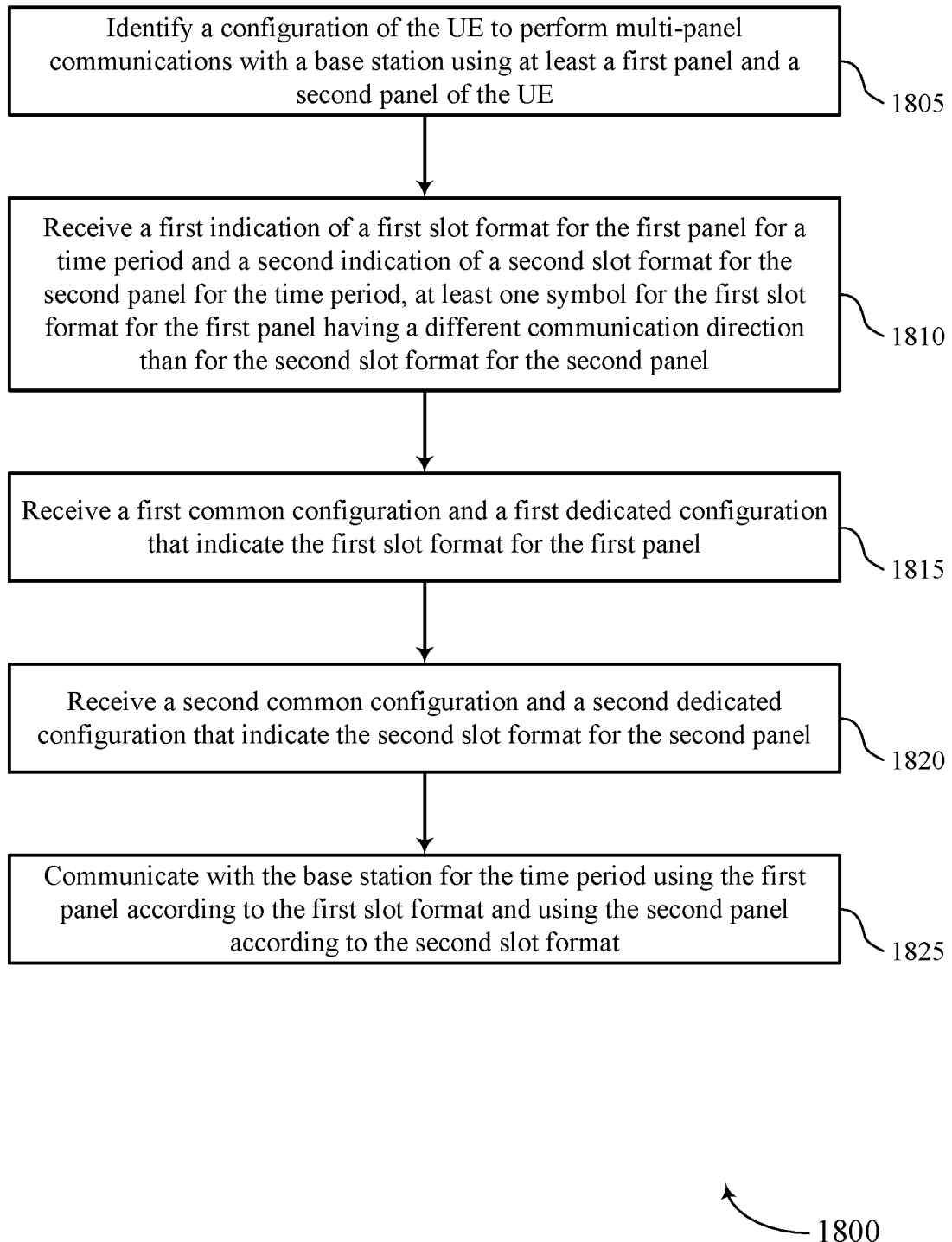

FIG. 18 shows a flowchart illustrating a method 1800 that supports panel-specific slot format indication in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may identify a configuration of the UE to perform multi-panel communications with a base station using at least a first panel and a second panel of the UE. The operations of 1805 may be performed according to the methods described herein. In some examples, aspects of the operations of 1805 may be performed by a configuration component as described with reference to FIGS. 8 through 11.

At 1810, the UE may receive a first indication of a first slot format for the first panel for a time period and a second indication of a second slot format for the second panel for the time period, at least one symbol for the first slot format for the first panel having a different communication direction than for the second slot format for the second panel. The operations of 1810 may be performed according to the methods described herein. In some examples, aspects of the operations of 1810 may be performed by a slot format component as described with reference to FIGS. 8 through 11.

At 1815, the UE may receive a first common configuration and a first dedicated configuration that indicate the first slot format for the first panel. The operations of 1815 may be performed according to the methods described herein. In some examples, aspects of the operations of 1815 may be performed by a configuration component as described with reference to FIGS. 8 through 11.

At 1820, the UE may receive a second common configuration and a second dedicated configuration that indicate the second slot format for the second panel. The operations of 1820 may be performed according to the methods described herein. In some examples, aspects of the operations of 1820 may be performed by a configuration component as described with reference to FIGS. 8 through 11.

At 1825, the UE may communicate with the base station for the time period using the first panel according to the first slot format and using the second panel according to the second slot format. The operations of 1825 may be performed according to the methods described herein. In some examples, aspects of the operations of 1825 may be performed by a panel component as described with reference to FIGS. 8 through 11.

Figure 19:
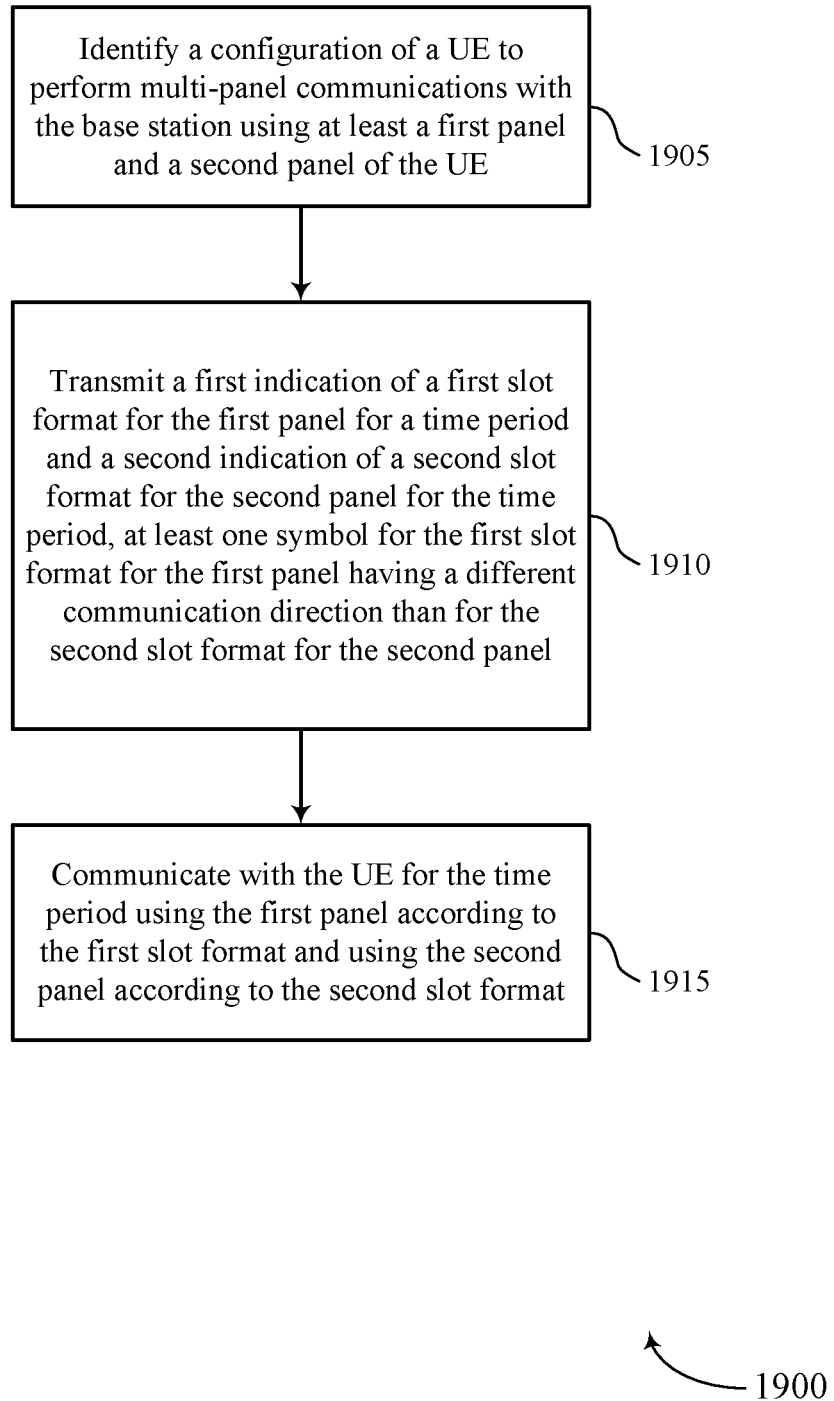

FIG. 19 shows a flowchart illustrating a method 1900 that supports panel-specific slot format indication in accordance with aspects of the present disclosure. The operations of method 1900 may be implemented by a base station 105 or its components as described herein. For example, the operations of method 1900 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1905, the base station may identify a configuration of a UE to perform multi-panel communications with the base station using at least a first panel and a second panel of the UE. The operations of 1905 may be performed according to the methods described herein. In some examples, aspects of the operations of 1905 may be performed by a configuration component as described with reference to FIGS. 12 through 15.

At 1910, the base station may transmit a first indication of a first slot format for the first panel for a time period and a second indication of a second slot format for the second panel for the time period, at least one symbol for the first slot format for the first panel having a different communication direction than for the second slot format for the second panel. The operations of 1910 may be performed according to the methods described herein. In some examples, aspects of the operations of 1910 may be performed by a slot format component as described with reference to FIGS. 12 through 15.

At 1915, the base station may communicate with the UE for the time period using the first panel according to the first slot format and using the second panel according to the second slot format. The operations of 1915 may be performed according to the methods described herein. In some examples, aspects of the operations of 1915 may be performed by a panel component as described with reference to FIGS. 12 through 15.

Figure 20:
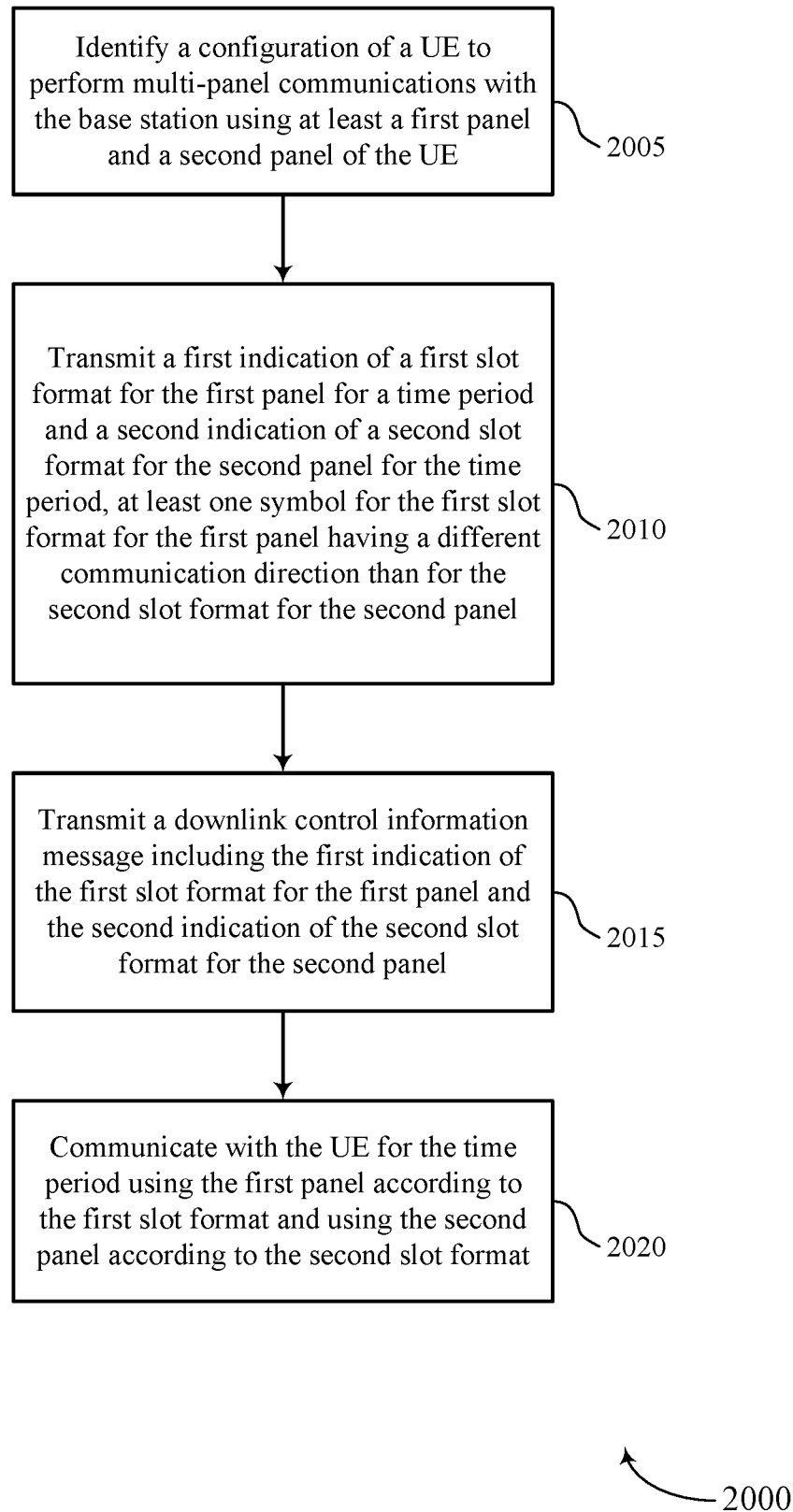

FIG. 20 shows a flowchart illustrating a method 2000 that supports panel-specific slot format indication in accordance with aspects of the present disclosure. The operations of method 2000 may be implemented by a base station 105 or its components as described herein. For example, the operations of method 2000 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2005, the base station may identify a configuration of a UE to perform multi-panel communications with the base station using at least a first panel and a second panel of the UE. The operations of 2005 may be performed according to the methods described herein. In some examples, aspects of the operations of 2005 may be performed by a configuration component as described with reference to FIGS. 12 through 15.

At 2010, the base station may transmit a first indication of a first slot format for the first panel for a time period and a second indication of a second slot format for the second panel for the time period, at least one symbol for the first slot format for the first panel having a different communication direction than for the second slot format for the second panel. The operations of 2010 may be performed according to the methods described herein. In some examples, aspects of the operations of 2010 may be performed by a slot format component as described with reference to FIGS. 12 through 15.

At 2015, the base station may transmit a DCI message including the first indication of the first slot format for the first panel and the second indication of the second slot format for the second panel. The operations of 2015 may be performed according to the methods described herein. In some examples, aspects of the operations of 2015 may be performed by a DCI component as described with reference to FIGS. 12 through 15.

At 2020, the base station may communicate with the UE for the time period using the first panel according to the first slot format and using the second panel according to the second slot format. The operations of 2020 may be performed according to the methods described herein. In some examples, aspects of the operations of 2020 may be performed by a panel component as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a user equipment (UE), comprising:
    a processor; and
    a memory coupled with the processor, with instructions stored in the memory, the instructions being executable by the processor to cause the apparatus to:
        identify a configuration of the UE to perform multi-panel communications with a network device using at least a first panel and a second panel of the UE;
        receive a first indication of a first slot format for the first panel for a time period and a second indication of a second slot format for the second panel for the time period, at least one symbol for the first slot format for the first panel having a different communication direction than for the second slot format for the second panel; and
        communicate with the network device for the time period using the first panel according to the first slot format and using the second panel according to the second slot format.

2. The method apparatus of claim 1, wherein the instructions are further executable by the processor to cause the apparatus to:
    transmit a message indicating a capability of the UE to perform the multi-panel communications, the configuration based at least in part on the transmitted message indicating the capability.

3. The apparatus of claim 1, wherein the instructions to receive the first indication and the second indication are further executable by the processor to cause the apparatus to:
    receive a first common configuration and a first dedicated configuration that indicate the first slot format for the first panel; and
    receive a second common configuration and a second dedicated configuration that indicate the second slot format for the second panel.

4. The apparatus of claim 1, wherein the instructions to receive the first indication and the second indication are further executable by the processor to cause the apparatus to:
    receive a downlink control information message comprising the first indication of the first slot format for the first panel and the second indication of the second slot format for the second panel.

5. The apparatus of claim 4, wherein the instructions are further executable by the processor to cause the apparatus to:
    receive an indication of a first position corresponding to the first indication and an indication of a second position corresponding to the second indication, wherein the first indication is received in the downlink control information message according to the first position, and the second indication is received in the downlink control information message according to the second position.

6. The apparatus of claim 4, wherein the instructions are further executable by the processor to cause the apparatus to:
    receive an indication of a position of a multi-panel slot format indication block in the downlink control information message, wherein the first indication and the second indication are received in the multi-panel slot format indication block in the downlink control information message according to the position.

7. The apparatus of claim 1, wherein the instructions are further executable by the processor to cause the apparatus to:
    receive a message identifying a first radio network temporary identifier associated with the first panel and a second radio network temporary identifier associated with the second panel, wherein the first indication is received based at least in part on the first radio network temporary identifier, and the second indication is received based at least in part on the second radio network temporary identifier.

8. The apparatus of claim 7, wherein the instructions are further executable by the processor to cause the apparatus to:
    monitor, according to the first radio network temporary identifier based at least in part on the received message, for a first downlink control information message comprising the first indication of the first slot format for the first panel, the first indication received based at least in part on the monitoring according to the first radio network temporary identifier; and
    monitor, according to the second radio network temporary identifier based at least in part on the received message, for a second downlink control information message comprising the second indication of the second slot format for the second panel, the second indication received based at least in part on the monitoring according to the second radio network temporary identifier.

9. The apparatus of claim 1, wherein the instructions are further executable by the processor to cause the apparatus to:
    receive a message identifying a first control search space associated with the first panel and a second control search space associated with the second panel, wherein the first indication is received in the first control search space, and the second indication is received in the second control search space.

10. The apparatus of claim 9, wherein the instructions are further executable by the processor to cause the apparatus to:
monitor, based at least in part on the received message, the first control search space for a first downlink control information message comprising the first indication of the first slot format for the first panel, the first indication received based at least in part on the monitoring the first control search space; and
monitor, based at least in part on the received message, the second control search space for a second downlink control information message comprising the second indication of the second slot format for the second panel, the second indication received based at least in part on the monitoring the second control search space.

11. The apparatus of claim 1, wherein the instructions to communicate are further executable by the processor to cause the apparatus to:
perform a sounding reference signal (SRS) transmission, a physical uplink control channel (PUCCH) transmission, a physical uplink shared channel (PUSCH) transmission, a physical random access channel (PRACH) transmission, or a combination thereof.

12. The apparatus of claim 1, wherein the instructions to communicate are further executable by the processor to cause the apparatus to:
transmit a first uplink transmission or receiving a first downlink transmission using the first panel according to the first slot format; and
transmit a second uplink transmission or receiving a second downlink transmission using the second panel according to the second slot format.

13. An apparatus for wireless communication at a network device, comprising:
a processor; and
a memory coupled with the processor, with instructions stored in the memory, the instructions being executable by the processor to cause the apparatus to:
identify a configuration of a user equipment (UE) to perform multi-panel communications with the network device using at least a first panel and a second panel of the UE;
transmit a first indication of a first slot format for the first panel for a time period and a second indication of a second slot format for the second panel for the time period, at least one symbol for the first slot format for the first panel having a different communication direction than for the second slot format for the second panel; and
communicate with the UE for the time period using the first panel according to the first slot format and using the second panel according to the second slot format.

14. The apparatus of claim 13, wherein the instructions are further executable by the processor to cause the apparatus to:
receive a message indicating a capability of the UE to perform the multi-panel communications, the configuration based at least in part on the received message indicating the capability.

15. The apparatus of claim 13, wherein the instructions to transmit the first indication and the second indication are further executable by the processor to cause the apparatus to:
transmit a first common configuration and a first dedicated configuration that indicate the first slot format for the first panel; and
transmit a second common configuration and a second dedicated configuration that indicate the second slot format for the second panel.

16. The apparatus of claim 13, wherein the instructions to transmit the first indication and the second indication are further executable by the processor to cause the apparatus to:
transmit a downlink control information message comprising the first indication of the first slot format for the first panel and the second indication of the second slot format for the second panel.

17. The apparatus of claim 16, wherein the instructions are further executable by the processor to cause the apparatus to:
transmit an indication of a first position corresponding to the first indication and an indication of a second position corresponding to the second indication, wherein the first indication is transmitted in the downlink control information message according to the first position, and the second indication is transmitted in the downlink control information message according to the indicated second position.

18. The apparatus of claim 16, wherein the instructions are further executable by the processor to cause the apparatus to:
transmit an indication of a position of a multi-panel slot format indication block in the downlink control information message, wherein the first indication and the second indication are transmitted in the multi-panel slot format indication block in the downlink control information message according to the indicated position.

19. The apparatus of claim 13, wherein the instructions are further executable by the processor to cause the apparatus to:
transmit a message identifying a first radio network temporary identifier associated with the first panel and a second radio network temporary identifier associated with the second panel, wherein the first indication is transmitted based at least in part on the first radio network temporary identifier, and the second indication is transmitted based at least in part on the second radio network temporary identifier.

20. The apparatus of claim 13, wherein the instructions are further executable by the processor to cause the apparatus to:
transmit a configuration identifying a first control search space associated with the first panel and a second control search space associated with the second panel, wherein the first indication is transmitted in the first control search space, and the second indication is transmitted in the second control search space.

21. The apparatus of claim 13, wherein the instructions are further executable by the processor to cause the apparatus to:
receive a sounding reference signal (SRS) transmission, a physical uplink control channel (PUCCH) transmission, a physical uplink shared channel (PUSCH) transmission, a physical random access channel (PRACH) transmission, or a combination thereof.

22. The apparatus of claim 13, wherein the instructions to communicate are further executable by the processor to cause the apparatus to:
receive a first uplink transmission or transmitting, to the UE, a first downlink transmission using the first panel according to the first slot format; and
receive a second uplink transmission or transmitting, to the UE, a second downlink transmission using the second panel according to the second slot format.

23. A method for wireless communication at a user equipment (UE), comprising:
- identifying a configuration of the UE to perform multi-panel communications with a network device using at least a first panel and a second panel of the UE;
- receiving a first indication of a first slot format for the first panel for a time period and a second indication of a second slot format for the second panel for the time period, at least one symbol for the first slot format for the first panel having a different communication direction than for the second slot format for the second panel; and
- communicating with the network device for the time period using the first panel according to the first slot format and using the second panel according to the second slot format.

24. The method of claim 23, further comprising:
- transmitting a message indicating a capability of the UE to perform the multi-panel communications, the configuration based at least in part on the transmitted message indicating the capability.

25. The method of claim 23, wherein receiving the first indication and the second indication comprises:
- receiving a first common configuration and a first dedicated configuration that indicate the first slot format for the first panel; and
- receiving a second common configuration and a second dedicated configuration that indicate the second slot format for the second panel.

26. The method of claim 23, wherein receiving the first indication and the second indication comprises:
- receiving a downlink control information message comprising the first indication of the first slot format for the first panel and the second indication of the second slot format for the second panel.

27. The method of claim 26, further comprising:
- receiving an indication of a first position corresponding to the first indication and an indication of a second position corresponding to the second indication, wherein the first indication is received in the downlink control information message according to the first position, and the second indication is received in the downlink control information message according to the second position.

28. The method of claim 26, further comprising:
- receiving an indication of a position of a multi-panel slot format indication block in the downlink control information message, wherein the first indication and the second indication are received in the multi-panel slot format indication block in the downlink control information message according to the position.

29. The method of claim 23, further comprising:
- receiving a message identifying a first radio network temporary identifier associated with the first panel and a second radio network temporary identifier associated with the second panel, wherein the first indication is received based at least in part on the first radio network temporary identifier, and the second indication is received based at least in part on the second radio network temporary identifier.

30. A method for wireless communication at a network device, comprising:
- identifying a configuration of a user equipment (UE) to perform multi-panel communications with the network device using at least a first panel and a second panel of the UE;
- transmitting a first indication of a first slot format for the first panel for a time period and a second indication of a second slot format for the second panel for the time period, at least one symbol for the first slot format for the first panel having a different communication direction than for the second slot format for the second panel; and
- communicating with the UE for the time period using the first panel according to the first slot format and using the second panel according to the second slot format.

\* \* \* \* \*